(12) United States Patent
Shi

(10) Patent No.: US 12,282,921 B2
(45) Date of Patent: Apr. 22, 2025

(54) BLOCKCHAIN-BASED DATA PROCESSING METHOD AND APPARATUS, DEVICE, READABLE STORAGE MEDIUM AND COMPUTER PROGRAM PRODUCT

(71) Applicant: Tencent Technology (Shenzhen) Company Limited, Shenzhen (CN)

(72) Inventor: Yifang Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 137 days.

(21) Appl. No.: 18/137,336

(22) Filed: Apr. 20, 2023

(65) Prior Publication Data

US 2023/0259938 A1 Aug. 17, 2023

Related U.S. Application Data

(63) Continuation of application No. PCT/CN2022/099549, filed on Jun. 17, 2022.

(30) Foreign Application Priority Data

Aug. 6, 2021 (CN) .......................... 202110901263.X

(51) Int. Cl.
*G06Q 20/40* (2012.01)
*G06Q 20/38* (2012.01)
*H04L 9/00* (2022.01)

(52) U.S. Cl.
CPC ............. *G06Q 20/401* (2013.01); *H04L 9/50* (2022.05); *G06Q 20/3825* (2013.01)

(58) Field of Classification Search
CPC .................................................. G06Q 20/401
See application file for complete search history.

(56) References Cited

U.S. PATENT DOCUMENTS

2014/0351142 A1 11/2014 Royyuru
2017/0163733 A1* 6/2017 Grefen .................... H04L 29/08
(Continued)

FOREIGN PATENT DOCUMENTS

CN 104680363 A 6/2015
CN 108769173 A 11/2018
(Continued)

OTHER PUBLICATIONS

Pandey, et al. in "Transaction Scheduling Protocols for Controlling Priority Inversion: A Review," from Computer Science Review, 2020 (Year: 2020).*

(Continued)

*Primary Examiner* — Olabode Akintola
*Assistant Examiner* — Brandon M Duck
(74) *Attorney, Agent, or Firm* — Morgan, Lewis & Bockius LLP

(57) ABSTRACT

Provided is a blockchain-based data processing method performed by a computer device. The method includes: determining a plurality of transactions having a same group identifier in a transaction pool as group transaction data; packetizing each of the group transaction data into a proposal block, and executing each of the group transaction data in the proposal block to obtain a corresponding transaction execution result; when at least one transaction execution result comprises a transaction execution failure result, setting the transaction execution result to each of the group transaction data, and updating the proposal block according to the transaction execution failure result to obtain a target proposal block; and when the target proposal block is passed by consensus, performing accounting on the target proposal block and the transaction execution failure result corresponding to each of the group transaction data.

15 Claims, 11 Drawing Sheets

(56) References Cited

U.S. PATENT DOCUMENTS

| | | | |
|---|---|---|---|
| 2020/0344070 A1* | 10/2020 | Li | .................... H04L 9/3247 |
| 2021/0165810 A1 | 6/2021 | Yang et al. | |
| 2021/0226773 A1* | 7/2021 | Snow | .................... H04L 9/06 |
| 2023/0247094 A1* | 8/2023 | Wang | .................... G06F 16/182 |

FOREIGN PATENT DOCUMENTS

| | | | | |
|---|---|---|---|---|
| CN | 109995850 | A | 7/2019 | |
| CN | 110415117 | A | 11/2019 | |
| CN | 111967862 | A | 11/2020 | |
| CN | 112685796 | A | 4/2021 | |
| CN | 113312362 | * | 8/2021 | ............ G06F 16/23 |
| CN | 113342838 | A | 9/2021 | |
| JP | 2021511561 | A | 5/2021 | |
| JP | 2021515311 | A | 6/2021 | |
| JP | 2022515949 | A | 2/2022 | |
| WO | WO 2019142884 | A1 | 7/2019 | |

OTHER PUBLICATIONS

Tencent Technology, Japanese Office Action, JP Patent Application No. 2023-558388, Nov. 22, 2024, 25 pgs.
Tencent Technology, WO, PCT/CN2022/099549, Sep. 14, 2022, 5 pgs.
Tencent Technology, IPRP, PCT/CN2022/099549, Feb. 6, 2024, 6 pgs.
Tencent Technology, ISR, PCT/CN2022/099549, Sep. 14, 2022, 3 pgs.

* cited by examiner

BLOCKCHAIN-BASED DATA PROCESSING METHOD AND APPARATUS, DEVICE, READABLE STORAGE MEDIUM AND COMPUTER PROGRAM PRODUCT

CROSS-REFERENCE TO RELATED APPLICATION

This application is a continuation application of PCT Patent Application No. PCT/CN2022/099549, entitled "BLOCKCHAIN-BASED DATA PROCESSING METHOD AND APPARATUS, DEVICE, READABLE STORAGE MEDIUM AND COMPUTER PROGRAM PRODUCT" filed on Jun. 17, 2022, which claims priority to Chinese Patent Application No. 202110901263.X, filed on Aug. 6, 2021, all of which is incorporated the embodiment of this application as a reference in its entirety.

FIELD OF THE TECHNOLOGY

This application relates to the field of computer technologies, and in particular, to a blockchain-based data processing method and apparatus, a device, a readable storage medium and a computer program product.

BACKGROUND OF THE DISCLOSURE

Blockchain is a new application mode that integrates computer technologies such as distributed data storage, point-to-point transmission, consensus mechanism and encryption algorithm. It is mainly used for organizing data in a chronological order and encrypting the data into a ledger, so that the data cannot be tampered with or forged while the data can be verified, stored and updated. Blockchain also allows for encrypted data transmission, node identification and secure access, and is an advanced distributed infrastructure. At present, because of the tamper-proofness and authenticity of blockchain, the application of blockchain is increasing.

A transaction is the smallest request unit in a blockchain system. A transaction can be regarded as an operation request to the blockchain server, which authorizes the blockchain system to perform some transaction operations. A single transaction involves only one or two parties. But in a multi-party collaboration scenario, multiple transactions are often created, and these transactions are supposed to be executed successfully or unsuccessfully at the same time to ensure the interests of all parties involved.

However, in the blockchain system of the related art, different transactions are independent and isolated from each other on the blockchain. For multiple transactions created in the multi-party collaboration scenario, if some transactions are executed unsuccessfully, the transactions that have been successfully executed will still be written to the blockchain ledger, and the successful party will not initiate a new transaction for the failed party, so the complete multi-party collaboration transaction cannot be stored in the blockchain ledger, resulting in the failure of the multi-party collaboration transaction based on blockchain and reducing the accuracy of transaction data in the blockchain.

SUMMARY

Embodiments of this application provide a blockchain-based data processing method and apparatus, a device, a readable storage medium and a computer program product, which can improve the accuracy of transaction data in the blockchain.

An embodiment of this application provides a method for processing blockchain-based transactions performed by a computer device acting as a consensus node of a blockchain network. The method includes:

determining, by the consensus node, a plurality of transactions having a same group identifier in a transaction pool as group transaction data;

packetizing each of the group transaction data into a proposal block, and executing each of the group transaction data in the proposal block to obtain a corresponding transaction execution result;

when at least one transaction execution result comprises a transaction execution failure result, setting the transaction execution result to each of the group transaction data, and updating the proposal block according to the transaction execution failure result to obtain a target proposal block; and when the target proposal block is passed by consensus, performing accounting on the target proposal block and the transaction execution failure result corresponding to each of the group transaction data.

An embodiment of this application provides a blockchain-based data processing method performed by a computer device mapped into a service node in a blockchain network. The method includes:

receiving, by the service node, a transaction request for a multi-party collaboration transaction transmitted by a terminal device;

determining a group identifier corresponding to the multi-party collaboration transaction according to the transaction request; and generating transaction data having the group identifier according to the group identifier corresponding to the multi-party collaboration transaction and the transaction request, and adding the transaction data to a transaction pool.

The transaction pool has a plurality of transactions having a same group identifier, the transaction data is used for a consensus node to be determined as group transaction data, and the consensus node is configured to packetize each of the group transaction data into a proposal block and execute each of the group transaction data in the proposal block to obtain an executed transaction execution result. The consensus node is further configured to update, when the executed transaction execution result includes a transaction execution failure result, a transaction execution result corresponding to each of the group transaction data to the transaction execution failure result.

An embodiment of this application provides a blockchain-based data processing apparatus, including:

a group determination module, configured to determine a plurality of transactions having a same group identifier in a transaction pool as group transaction data;

a packetizing module, configured to packetize each of the group transaction data into a proposal block;

a block execution module, configured to execute each of the group transaction data in the proposal block to obtain a corresponding transaction execution result;

a result updating module, configured to when at least one transaction execution result comprises a transaction execution failure result, set the transaction execution result to each of the group transaction data;

a block updating module, configured to update the proposal block according to the transaction execution failure result to obtain a target proposal block; and an accounting module, configured to, when the target proposal block is passed by consensus, perform accounting on the target proposal block and the transaction execution failure result corresponding to each of the group transaction data.

An embodiment of this application provides a blockchain-based data processing apparatus, including:

a request receiving module, configured to receive a transaction request for a multi-party collaboration transaction transmitted by a terminal device;

an identifier determination module, configured to determine a group identifier corresponding to the multi-party collaboration transaction according to the transaction request; and a data adding module, configured to generate transaction data having the group identifier according to the group identifier corresponding to the multi-party collaboration transaction and the transaction request, and add the transaction data to a transaction pool.

The transaction pool has a plurality of transactions having a same group identifier, the transaction data is used for a consensus node to be determined as group transaction data, and the consensus node is configured to packetize each of the group transaction data into a proposal block and execute each of the group transaction data in the proposal block to obtain an executed transaction execution result. The consensus node is further configured to update, when the executed transaction execution result includes a transaction execution failure result, a transaction execution result corresponding to each of the group transaction data to the transaction execution failure result.

An embodiment of this application provides a computer device, including: a processor, a memory and a network interface.

The processor is connected to the memory and the network interface. The network interface is configured to provide a data communication network element. The memory is configured to store a computer program. The processor is configured to invoke the computer program to execute the method in the embodiments of this application.

An embodiment of this application provides a non-transitory computer-readable storage medium. The computer-readable storage medium stores a computer program. The computer program is suitable to be loaded by a processor and execute the method in the embodiments of this application.

An embodiment of this application provides a computer program product or a computer program. The computer program product or the computer program includes a computer instruction stored in a computer-readable storage medium. A processor of a computer device reads the computer instruction from the computer-readable storage medium. The processor executes the computer instruction such that the computer device executes the method in the embodiments of this application.

In the embodiments of this application, the group transaction data having the same group identifier can be packetized into the same proposal block, and as long as one group transaction data is executed unsuccessfully, all the group transaction data are confirmed to be executed unsuccessfully, which can prevent, after a part of the group transaction data generated under the multi-party collaboration transaction are executed unsuccessfully, a part of the group transaction data with successful transactions from being written into the blockchain. Therefore, according to the embodiments of this application, only when all the group transaction data are executed successfully, can the blockchain-based multi-party collaboration transaction be successful, so as to improve the accuracy of transaction data in the blockchain.

DESCRIPTION OF EMBODIMENTS

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

A transaction involved in the embodiments of this application, also called a transaction request, includes an operation to be committed to the blockchain network for execution and a corresponding transaction result. The transactions involved in the embodiments of this application are not limited to transactions in a business context, i.e., the transaction data are not limited to data related to digital currency, etc. For example, the transaction may be a deploy transaction or an invoke transaction. The deploy transaction is used for deploying a smart contract into nodes of a blockchain network and getting ready to be invoked. The invoke transaction is used for performing a query operation (i.e., a read operation) or an update operation (i.e., a write operation, including an add operation, a delete operation and a modify operation) on a state database in a ledger.

Figure 1:
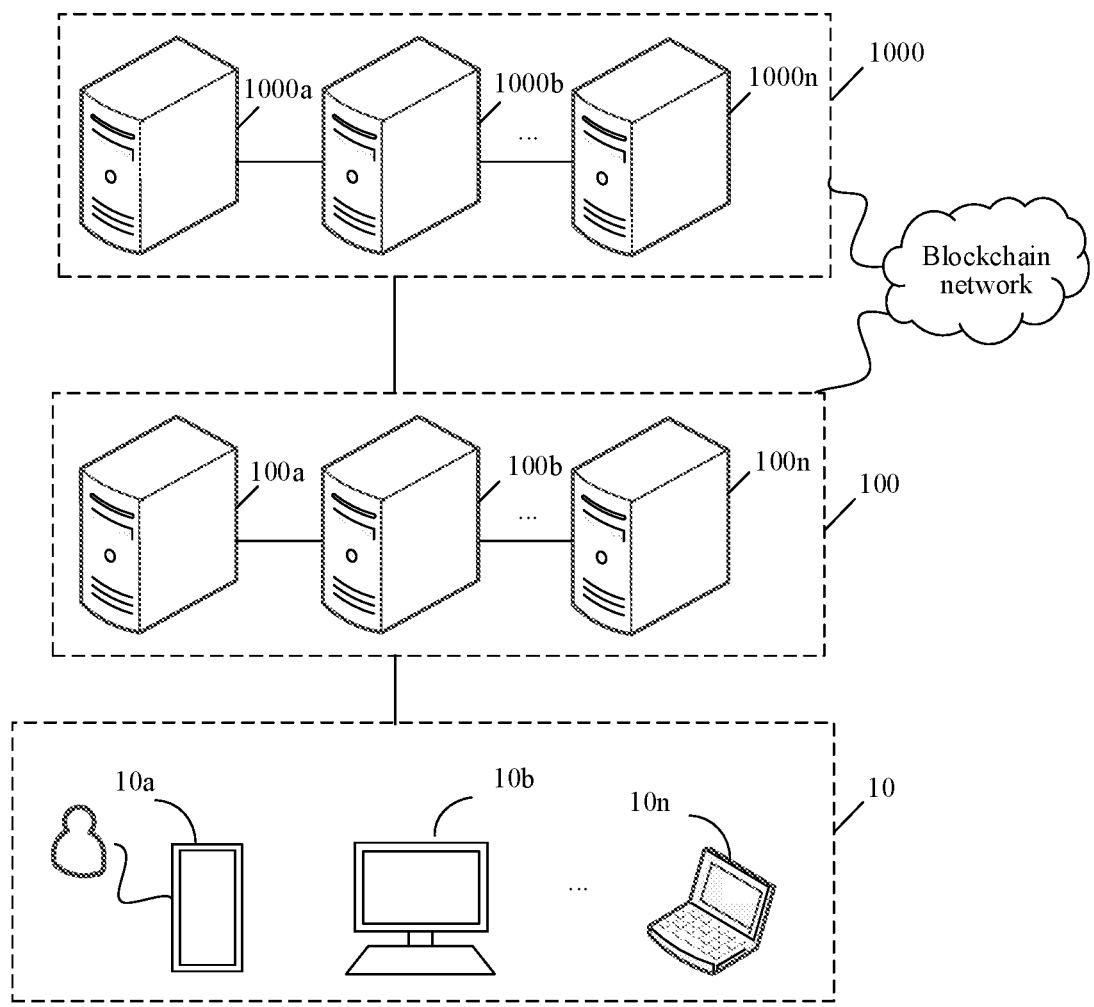
FIG. 1 is a schematic diagram of a network architecture according to an embodiment of this application.

Referring to FIG. 1, FIG. 1 is a schematic diagram of a network architecture according to an embodiment of this application. Blockchain is a new application mode of computer technology such as distributed data storage, point-to-point transmission, consensus mechanism and encryption algorithm. It is mainly used for organizing data in a chronological order and encrypting the data into a ledger, so that the data cannot be tampered with or forged while the data can be verified, stored and updated. The blockchain is essentially a decentralized database in which each node stores an identical blockchain. Nodes in a blockchain network includes consensus nodes (e.g., a consensus node 1000a shown in FIG. 1) and service nodes (e.g., a service node 100a shown in FIG. 1). The consensus node is used for reaching a consensus across the blockchain network. The service node is used for processing a transaction request transmitted by a terminal device (running with a client). The process of transaction data being written into the ledger in the blockchain network may include: a client transmits transaction data to a service node, and then the transaction data are passed between the service nodes in the blockchain network in relays until the consensus node receives the transaction data; the consensus node packetizes the transaction data into a block and seeks consensus with other consensus nodes; and after the consensus is reached, the block carrying the transaction data is written into the ledger.

It is to be understood that a block is a data packet that carries transaction data (i.e., transaction service) on the blockchain network, and also a data structure marked with a timestamp and a hash value of the previous block. The block is verified by a consensus mechanism of the network to determine the transactions in the block.

It is to be understood that a hash value, also called an information feature value or a feature value, is generated by converting input data of any length into a password through a hashing algorithm and outputting the password in a fixed way. The original input data cannot be retrieved by decrypting the hash value, and the hashing algorithm is a one-way encryption function. In the blockchain, each block (except the initial block) contains the hash value of the previous block, which is called the parent block of the current block. The hash value is the core foundation and most important part of blockchain technology that ensures the authenticity of recorded data and viewed data, as well as the integrity of the blockchain as a whole.

It is to be understood that a blockchain system may include a smart contract. This smart contract can be understood in the blockchain system as code that can be understood and executed by nodes (including consensus nodes) in the blockchain. The smart contract can execute any logic and obtain a result. The user can invoke a smart contract that has been deployed in the blockchain by initiating a transaction service request through a client. Then, the service node in the blockchain can transmit the transaction service request to the consensus nodes, and the consensus nodes in the blockchain can run the smart contract respectively. It is to be understood that the blockchain may include one or more smart contracts which can be distinguished by identity document (ID) or name, and the transaction service request initiated by the client may also carry the ID or name of the smart contract, thereby specifying the smart contract that the blockchain needs to run. If the smart contract specified by the client is the contract that needs to read data, each consensus node will access the local ledger to read the data, and finally each consensus node will verify whether the execution result is consistent with each other (i.e., seek consensus). If so, the execution result can be stored in the respective local ledger and returned to the client.

As shown in FIG. 1, the network architecture may include a consensus node cluster 1000, a service node cluster 100 and a terminal device (running with a client) cluster 10. The consensus node cluster 1000 may include at least two consensus nodes, and the service node cluster 100 may include at least two service nodes. As shown in FIG. 1, the consensus node cluster 1000 may include a consensus node 1000a, a consensus node 1000b, . . . , and a consensus node 1000n. The service node cluster 100 may specifically include a service node 100a, a service node 100b, . . . , and a service node 100n. The terminal device cluster 10 may specifically include a terminal device 10a, a terminal device 10b, and a terminal device 10n.

As shown in FIG. 1, the terminal device 10a, the terminal device 10b, . . . , and the terminal device 10n may perform network connection respectively with the service node 100a, the service node 100b, . . . , and the service node 100n, so that the terminal device can perform data interaction with the service node through the network connection. The service node 100a, the service node 100b, . . . , and the service node 100n may perform network connection respectively with the consensus node 1000a, the consensus node 1000b, . . . , and the consensus node 1000n, so that the service node can perform data interaction with the consensus node through the network connection. The service node 100a, the service node 100b, . . . , and the service node 100n are connected with each other, so that the service nodes can perform data interaction with the each other. The consensus node 1000a, the consensus node 1000b, . . . , and the consensus node 1000n are connected with each other, so that the consensus nodes can perform data interaction with the each other.

It is to be understood that blockchain nodes (which may be the service nodes or consensus nodes mentioned above) may perform data or block transmission through the above-mentioned data connection. A blockchain network can realize data connection between the blockchain nodes based on node identifiers. Each blockchain node in the blockchain network has a corresponding node identifier, and can store the node identifiers of the other blockchain nodes connected with itself, so that the acquired data or generated block can be broadcast to the other blockchain nodes according to the node identifiers of the other blockchain nodes. For example, a node identifier list as shown in Table 1 can be maintained in the service node 100a. This node identifier list stores node names and node identifiers of the other blockchain nodes:

TABLE 1

| Node name | Node identifier |
| --- | --- |
| Service node 100a | 117.114.151.174 |
| Consensus node 1000a | 117.116.189.145 |
| Service node 100b | 117.114.151.183 |
| Consensus node 1000b | 117.117.125.169 |
| . . . | . . . |
| Consensus node 1000n | 117.116.189.125 |

The node identifier can be the Internet Protocol (IP) address and any other information that can be used to identify the blockchain node in the blockchain network. In Table 1, only the IP address is taken as an example. For example, the service node 100a may transmit information (e.g., transaction data) to the consensus node 1000a through the node identifier 117.116.189.145, and the consensus node

1000*a* may determine that the information is transmitted by the service node 100*a* through the node identifier 117.114.151.174.

It is to be understood that there is no limitation to the manner of the data connection, which may be direct or indirect connection through wired communication, direct or indirect connection through wireless communication or other connection manners, which is not limited here in this application.

It is to be understood that the blockchain-based data processing method according to the embodiments of this application may be executed by a computer device. The computer device includes, but not limited to, the above-mentioned consensus node or service node (which may be a terminal or a server). The server may be an independent physical server, or a server cluster or distributed system including a plurality of physical servers, or a cloud server that provides basic cloud computing services such as cloud services, cloud databases, cloud computing, cloud functions, cloud storage, network services, cloud communication, middleware services, domain name services, security services, CDN, and big data and artificial intelligence platforms. The terminal may be a smart phone, a tablet computer, a notebook computer, a desktop computer, a smart speaker, a smart watch, an in-vehicle terminal or the like, but is not limited thereto.

As shown in FIG. 1, any consensus node in the consensus node cluster 1000 may serve as a block producer, which acquires a plurality of transactions having a same group identifier from the transaction pool and determines each of the transaction data as group transaction data. The transaction pool is a temporary list for storing transaction data that every blockchain node in the blockchain network needs to maintain. The blockchain node temporarily stores the transaction data known in the blockchain network but not included in the blockchain through the transaction pool. Then, the block producer may packetize each of the group transaction data into a proposal block (a block for storing group transaction data in the blockchain), and execute each of the group transaction data in the proposal block in sequence to obtain an executed transaction execution result. When the executed transaction execution result includes a transaction execution failure result, a transaction execution result corresponding to each of the group transaction data is updated to the transaction execution failure result, and the proposal block is updated according to the transaction execution failure result corresponding to each of the group transaction data to obtain a target proposal block. Then, after the target proposal block is passed by consensus, accounting processing is performed on the target proposal block and the transaction execution failure result corresponding to each of the group transaction data. The process of updating the proposal block according to the transaction execution failure result corresponding to each of the group transaction data to obtain a target proposal block may include: generating a result Merkle tree according to the transaction execution failure result corresponding to each of the group transaction data, and adding a root hash value of the result Merkle tree to a block header of the proposal block to obtain the target proposal block. The accounting processing refers to writing and storing the target proposal block and the transaction execution failure result corresponding to each of the group transaction data into the blockchain ledger. When the executed transaction execution result does not include the transaction execution failure result, the result Merkle tree is directly generated according to the executed transaction execution result, the root hash value of the result Merkle tree is added to the proposal block to obtain an updated proposal block, and then, accounting processing is performed on the updated proposal block and the executed transaction execution result.

The transaction data in the transaction pool may be transmitted by any service node in the service node cluster 100. As shown in FIG. 1, any service node in the service node cluster 100 may receive a transaction request for a multi-party collaboration transaction transmitted by the terminal device in the terminal device cluster 10. There are a plurality of the transaction requests. When there are a plurality of the transaction requests, the transaction requests may be transmitted by the same terminal device or different terminal devices, which is not limited here. The multi-party collaboration transaction refers to a scenario in which a plurality of participants conduct transactions together, which may often result in one or more transactions that are supposed to be executed successfully at the same time and then written together into the blockchain ledger. Then, any service node in the service node cluster 100 may determine the group identifier corresponding to the multi-party collaboration transaction according to the transaction request, then generate the transaction data having the group identifier according to the group identifier corresponding to the multi-party collaboration transaction and the transaction request, add the transaction data having the group identifier into the transaction pool, and wait for the above-mentioned block producer to process it. For example, the terminal device in the terminal device cluster 10 may directly acquire the group identifier corresponding to the multi-party collaboration transaction, generate the transaction request for the multi-party collaboration transaction based on the group identifier, and transmit the transaction request carrying the group identifier to any service node in the service node cluster 100; and after receiving the transaction request carrying the group identifier, the service node may directly generate transaction data having the group identifier, and add the transaction data carrying the group identifier into the transaction pool.

Figure 2A:
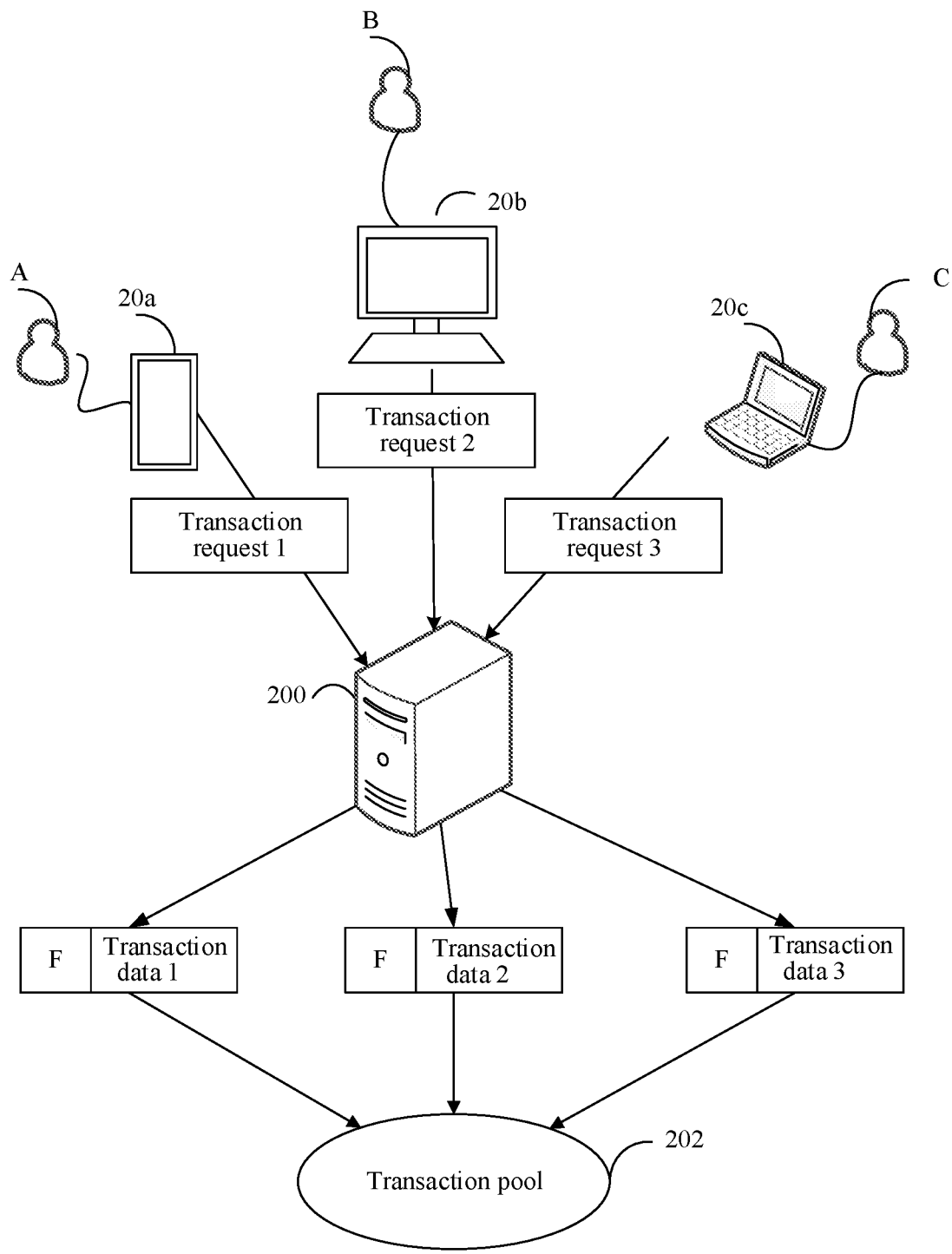
FIG. 2a to FIG. 2b are schematic diagrams showing a blockchain-based data processing scenario according to an embodiment of this application.
Figure 2B:
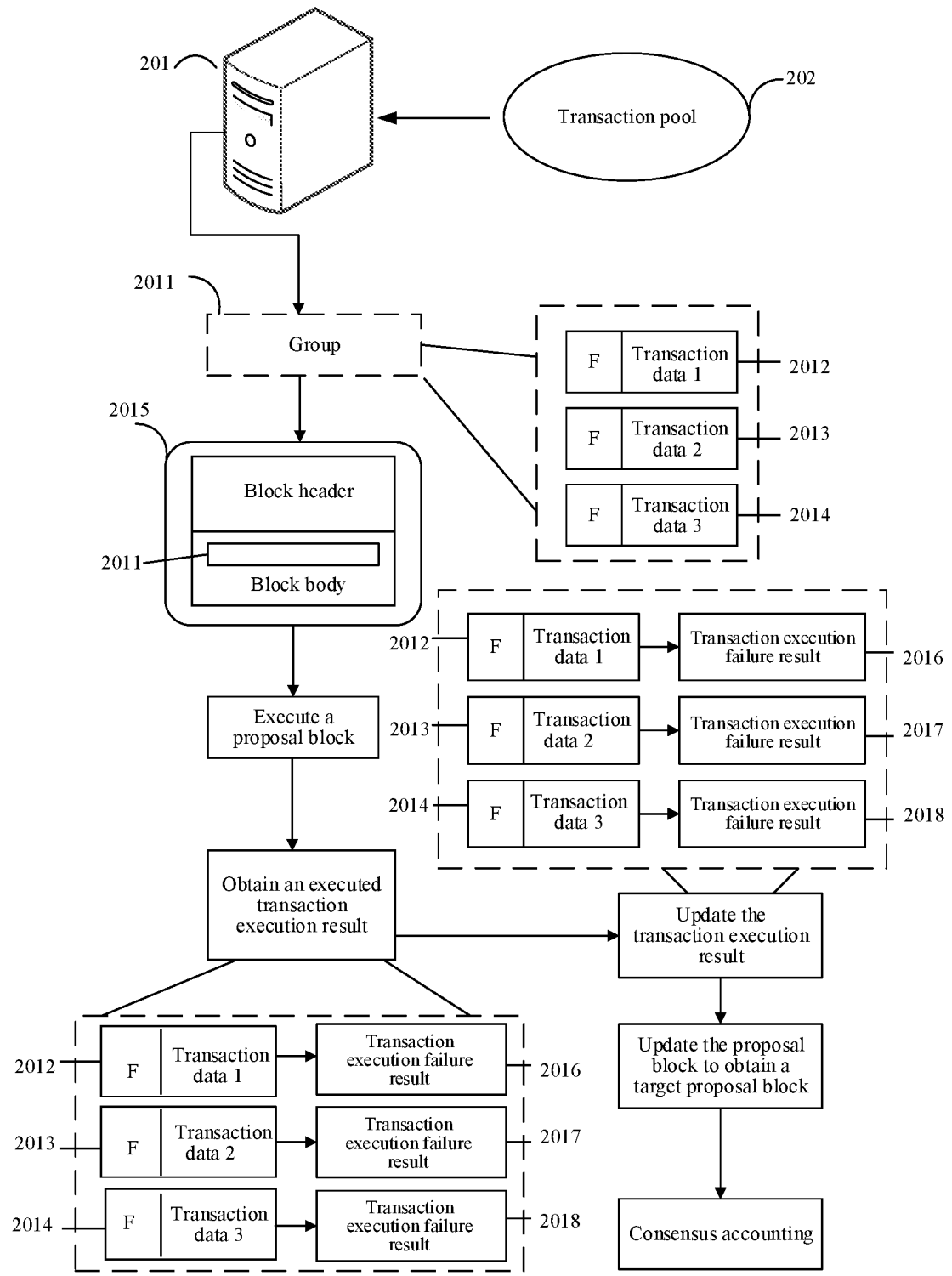

For the convenience of understanding, FIG. 2*a* to FIG. 2*b* show schematic diagrams showing a blockchain-based data processing scenario according to an embodiment of this application. A terminal device 20*a* corresponding to User A, a terminal device 20*b* corresponding to User B and a terminal device 20*c* corresponding to User C shown in FIG. 2*a* may be any terminal device in the terminal device cluster 10 in FIG. 1. For example, the terminal device 20*a* may be the terminal device 10*a*, the terminal device 20*b* may be the terminal device 10*b*, and the terminal device 20*c* may be the terminal device 10*n*. The service node 200 as shown in FIG. 2*a* may be any service node in the service node cluster 100 in FIG. 1. For example, the service node may be the service node 100*b*. The consensus node 201 shown in FIG. 2*b* may be any service node in the consensus node cluster 1000 in FIG. 1. For example, the consensus node may be the consensus node 1000*a*.

As shown in FIG. 2*a*, User A, User B, User C and User D (not shown) are participating in a multi-party collaboration transaction f. As agreed by the four, User A needs to transfer 100 yuan to User B, User B needs to transfer 60 yuan to User C, and User C needs to transfer 30 yuan to User D. Therefore, User A initiates a transaction request 1 for "User A transfers 100 yuan to User B" via the terminal device 20*a*, User B initiates a transaction request 2 for "User B transfers 60 yuan to User C" via the terminal device 20*b*, and User C initiates a transaction request 3 for "User C transfers 30 yuan to User D" via the terminal device 20*c*. It is to be understood that if the transaction request 2 is executed unsuccessfully and the transaction request 1 and the transaction request 3 are executed successfully, that is, if User A successfully transfers money to User B, and User C successfully transfers money to User D, but User B fails to transfer money to User C, User B will receive an additional 60 yuan. At this time, if User B rejects to return money to User A and also rejects to transfer 60 yuan to User C again, the interests of both User A and User C may be lost, and the success of the blockchain-based multi-party collaboration transaction and the accuracy of the transaction data in the blockchain cannot be guaranteed. In this embodiment of this application, a plurality of transactions generated under the multi-party collaboration transaction can be treated as group transactions of the same group. If any group transaction in the same group is executed unsuccessfully, all the group transactions are considered as being executed unsuccessfully, thus ensuring the success of the blockchain-based multi-party collaboration transaction, and further improving the accuracy of the transaction data of in the blockchain.

As shown in FIG. 2a, User A, User B and User C are conducting a federated learning task for an item recommendation model. User A has the first part of training data for the item recommendation model, User B has the second part of training data for the item recommendation model, and User C has the third part of training data for the item recommendation model. The first part of training data, the second part of training data and the third part of training data constitute complete training data for training the item recommendation model. Therefore, User A initiates a transaction request 1 for "Train item recommendation model with the first part of training data" via the terminal device 20a, User B initiates a transaction request 2 for "Train item recommendation model with the second part of training data" via the terminal device 20b, and User C initiates a transaction request 3 for "Train item recommendation model with the third part of training data" via the terminal device 20c. It is to be understood that if the transaction request 2 is executed unsuccessfully and the transaction request 1 and the transaction request 3 are executed successfully, that is, if the item recommendation model is trained with the first part of training data successfully, and the item recommendation model is trained with the third part of training data successfully, but the item recommendation model is trained with the second part of training data unsuccessfully, the item recommendation model will be trained unsuccessfully due to the lack of training with the second part of training data. Even if the transaction data of training the item recommendation model with the first part of training data and the transaction data of training the item recommendation model with the third part of training data are stored, the success of the blockchain-based multi-party collaboration transaction, i.e., the success of the item recommendation model, cannot be guaranteed. Only when all the transactions are successfully executed, can the success of the blockchain-based multi-party collaboration transaction be guaranteed, which improves the accuracy of the transaction data in blockchain. Moreover, based on the characteristics of data privacy protection of federated learning, the model is trained independently with the respective training data, thereby improving the security of the transaction data in the blockchain.

As shown in FIG. 2a, User A, User B and User C are conducting a collaborative development task for a target code. User A needs to develop the first part of code of the target code, User B needs to develop the second part of code of the target code, and User C needs to develop the third part of code of the target code. The first part of code, the second part of code and the third part of code constitute the complete target code. Therefore, User A initiates a transaction request 1 for "Development task for the first part of code" via the terminal device 20a, User B initiates a transaction request 2 for "Development task for the second part of code" via the terminal device 20b, and User C initiates a transaction request 3 for "Development task for the third part of code" via the terminal device 20c. It is to be understood that if the transaction request 2 is executed successfully and the transaction request 1 and the transaction request 3 are executed successfully, i.e., if the first part of code is developed successfully, and the third part of code is developed successfully, but the second part of code is developed unsuccessfully, the target code will be developed unsuccessfully due to the lack of the second part of code, and the success of the blockchain-based multi-party collaboration transaction cannot be guaranteed. Only when all the transactions are executed successfully, can the success of the blockchain-based multi-party collaboration transaction be guaranteed, which improves the accuracy and completeness of the transaction data in the blockchain. Moreover, through the multi-party code collaborative development, the development efficiency of transaction data (i.e., developed code) in the blockchain is improved.

As shown in FIG. 2a, after receiving the transaction request 1, the transaction request 2 and the transaction request 3, the service node 200 determines a group identifier corresponding to the multi-party collaboration transaction f, which is assumed to be group identifier F. Then, the service node generates transaction data having the group identifier according to the group identifier corresponding to the multi-party collaboration transaction and the transaction request. That is, as shown in FIG. 2a, the service node 200 generates transaction data 1 according to the transaction request 1 and the group identifier F, the service node 200 generates transaction data 2 according to the transaction request 2 and the group identifier F, and the service node 200 generates transaction data 3 according to the transaction request 3 and the group identifier F. The transaction data 1, the transaction data 2 and the transaction data 3 all carry the group identifier F. Then, the service node 200 adds the transaction data 1, the transaction data 2 and the transaction data 3 into a transaction pool 202. As is known from the above, the transaction pool 202 is a temporary list for storing transaction data that every blockchain node in the blockchain network needs to maintain.

For example, after entering the transaction pool, the transaction data having the group identifier waits to be packetized into the proposal block by the block producer. Assuming that the block producer is the consensus node 201, the consensus node 201 may extract transaction data from the transaction pool 202, packetize it into the proposal block, and broadcast it to the blockchain network for consensus accounting processing. As shown in FIG. 2b, the consensus node 201 determines the transaction data 1, the transaction data 2 and the transaction data 3 having the group identifier F from the transaction pool as group transaction data of a same group 2011, and then packetizes each of the group transaction data in the group 2011 into a proposal block 2015. The proposal block includes a block header and a block body. The block header stores basic data such as version number, timestamp and difficulty level, and may also store other related data. The block body is used for storing each of the group transaction data in the group 2011. It is to be understood that group transaction data corresponding to a plurality of groups may be stored in the proposal block. Among transaction execution results corresponding to the group transaction data in the same group, if one of the transaction execution results is a transaction execution failure result, then the transaction execution results corresponding all the group transaction data in the group will be updated to the transaction execution failure results. The transaction execution results corresponding to the group transaction data in different groups do not affect each other. Assuming that the proposal block includes group transaction data respectively corresponding to Group A and Group B, if group transaction data a in Group A is executed unsuccessfully, the transaction execution results corresponding to the group transaction data in group B will not be affected.

As shown in FIG. 2b, the consensus node 201 executes each of the group transaction data in the proposal block in sequence, i.e., sequentially executes group transaction data 2012, group transaction data 2013 and group transaction data 2014, to obtain an executed transaction execution result. Assuming that a transaction execution result 2016 corresponding to the group transaction data 2012 is a transaction execution success result, a transaction execution result 2017 corresponding to the group transaction data 2013 is a transaction execution success result and a transaction execution result 2018 corresponding to the group transaction data 2014 is a transaction execution failure result, i.e., the executed transaction execution result includes a transaction execution failure result, then the consensus node 201 will update the transaction execution result, i.e., update all the transaction execution results corresponding to each of the group transaction data to the transaction execution failure results. After the completion of the updating, the transaction execution result 2016 corresponding to the group transaction data 2012 is the transaction execution failure result, the transaction execution result 2017 corresponding to the group transaction data 2013 is the transaction execution failure result, and the transaction execution result 2018 corresponding to the group transaction data 2014 is the transaction execution failure result. The consensus node 201 will update the proposal block according to the transaction execution failure result corresponding to each of the group transaction data to obtain a target proposal block, and then perform consensus accounting on the target proposal block. That is, after a consensus of the consensus node cluster (which may be the consensus node cluster 1000 shown in FIG. 1) in the blockchain is reached, the consensus node 201 may perform accounting on the target proposal block and the transaction execution failure result corresponding to each of the group transaction data.

Figure 3:
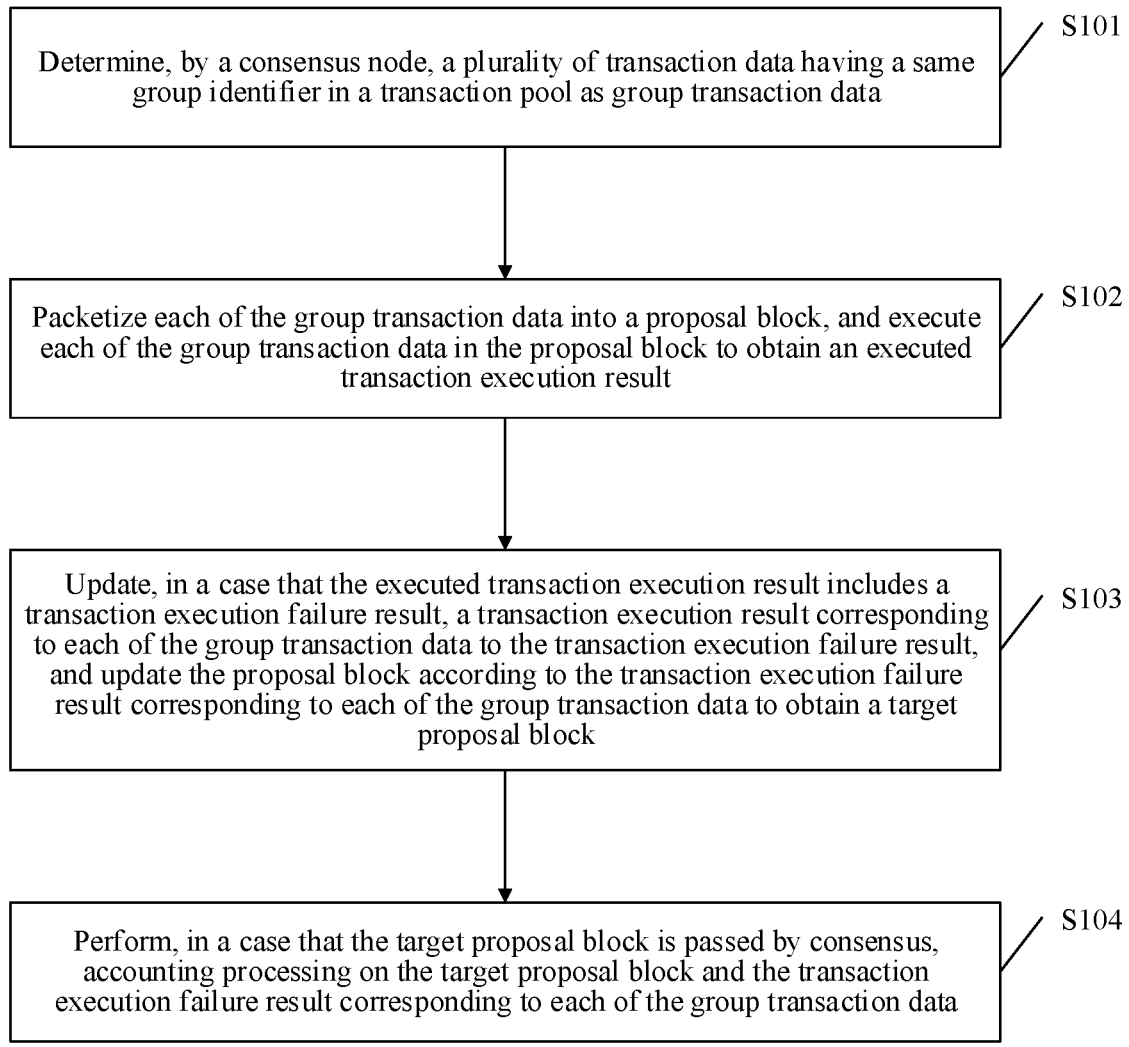
FIG. 3 is a schematic flowchart of a blockchain-based data processing method according to an embodiment of this application.

Referring to FIG. 3, FIG. 3 is a schematic flowchart of a blockchain-based data processing method according to an embodiment of this application. The method may be executed by a consensus node (e.g., the consensus node in FIG. 1), or jointly executed by a service node, a consensus node (e.g., the consensus node in the embodiment corresponding to FIG. 1) and a terminal device (e.g., the terminal device in the embodiment corresponding to FIG. 1). The following is an example in which the method is executed by a consensus node. The blockchain-based data processing method may at least include step S101 to step S104 as follows:

Step S101: Determine, by a consensus node, a plurality of transactions having a same group identifier in a transaction pool as group transaction data.

For example, the group identifier is used for identifying a transaction group to which the transaction data belongs. In other words, the transaction data included in the same transaction group have the same group identifier. It is to be understood that the group identifier is unique, i.e., different transaction groups correspond to different group identifiers, and transaction data belonging to different transaction groups correspond to different group identifiers. In a blockchain system in the related art, the transactions in the blockchain are mutually independent and isolated, and the successful or unsuccessful execution of one transaction will not affect the other transactions. However, according to the transaction group in this embodiment of this application, a plurality of related transactions in the blockchain are added into the same transaction group. The transaction group has the following characteristic: the transactions in the transaction group are all executed successfully or unsuccessfully.

For example, after generating transaction data, the service node will add the transaction data into the transaction pool, and then wait until the consensus node capable of producing blocks (i.e., block producer) takes the transaction data out of the transaction pool and packetizes the transaction data into the proposal block. The transaction data corresponding to the transactions added to the same transaction group carry the group identifier, and the consensus node determines the plurality of transactions having the same group identifier in the transaction pool as the group transaction data.

In some embodiments, the process of determining, by the consensus node, the group transaction data may include: the consensus node may acquire transaction data from the transaction pool. The transaction data includes a group identifier and a group transaction quantity. The group transaction quantity refers to the quantity of transactions included in the transaction group corresponding to the group identifier. Then, the consensus node may add the transaction data to a group cache queue corresponding to the group identifier to obtain an updated group cache queue. When a quantity of transaction data in the updated group cache queue is equal to the group transaction quantity, the transaction data in the updated group cache queue is determined as the group transaction data. When the quantity of transaction data in the updated group cache queue is less than the group transaction quantity, new transaction data including the group identifier are acquired from the transaction pool.

The group cache queue is used for temporarily storing the transaction data corresponding to some transactions in the transaction group that have been acquired by the consensus node. The group cache queue corresponding to the group identifier is created by the consensus node after acquiring the first transaction data carrying the group identifier. When all the transaction data in the group cache queue are packetized into the blockchain, the transaction data in the group cache queue will be wiped off, and the resources occupied by the group cache queue will be released, that is, the consensus node will delete the group cache queue.

For the convenience of understanding, it is assumed that the consensus node acquires transaction data A including a group identifier m and a group transaction quantity, the group transaction quantity being 3. Then, the consensus node will add the transaction data A into the group cache queue corresponding to the group identifier m to obtain an updated cache queue. If the consensus node does not find the group cache queue corresponding to the group identifier m, the consensus node will create a group cache queue corresponding to the group identifier m, and then add the transaction data A into the group cache queue. For example, the size of the group cache queue may be adjusted dynamically according to the group transaction quantity to avoid occupying too many internal memory resources. Then, the consensus node will determine the quantity of transaction data in the updated cache queue. If the group cache queue includes transaction data B added previously, then the quantity of transaction data in the updated cache queue is 2, which is less than the group transaction quantity. The consensus node will acquire new transaction data from the transaction pool, determine the group identifier corresponding to the new transaction data, add the new transaction data into the group cache queue corresponding to the group identifier m, and then repeat the above process, until the group identifier corresponding to new transaction data C acquired by the consensus node is the group identifier m. Then, the consensus node will add the transaction data C into the updated group cache queue to obtain a new updated group cache queue. At this time, the new updated group cache queue includes the transaction data A, the transaction data B and the transaction data C. The quantity of transaction data is 3, which is equal to the group transaction quantity. Then, the consensus node will determine the transaction data A, the transaction data B and the transaction data C as group transaction data corresponding to the same transaction group.

In some embodiments, the process of acquiring, when the quantity of transaction data in the updated group cache queue is less than the target group transaction quantity, new transaction data including the target group identifier from the transaction pool may include: when the quantity of transaction data in the updated group cache queue is less than the group transaction quantity and a current time is within a cache time period, new transaction data including the group identifier are acquired from the transaction pool. When the quantity of transaction data in the updated group cache queue is less than the group transaction quantity and the current time exceeds the cache time period, the transaction data in the updated group cache queue are placed back into the transaction pool, and the updated group cache queue is emptied.

Group identifiers of different transaction groups correspond to different group cache queues. If the consensus node fails to acquire all the transaction data belonging to the same transaction group, the group cache queue will occupy the internal memory resources of the consensus node all the time, thereby wasting a lot of internal memory resources. Therefore, a cache time period, i.e., the longest time period a group cache queue can exist from the time it is created, may be set. If the existence time of the group cache queue exceeds the cache time period, the transaction data in the group cache queue will be placed back into the transaction pool, and the group cache queue will be emptied to prevent the group cache queue from occupying the internal memory resources of the consensus node, thereby saving the internal memory resources.

Step S102: Packetize each of the group transaction data into a proposal block, and execute each of the group transaction data in the proposal block to obtain an executed transaction execution result.

In some embodiments, the group transaction data may include an execution sequence identifier, which refers to the execution sequence of transactions in a transaction group. In this case, the process of packetizing each of the group transaction data into a proposal block may include: each of the group transaction data is sorted according to the execution sequence identifier included in each of the group transaction data to obtain the sorted group transaction data; and then the sorted group transaction data are packetized into the proposal block. Subsequently, the consensus node sequentially executes each of the group transaction data in the proposal block according to the sequence in which the group transaction data are packetized, to obtain the executed transaction execution result.

In this embodiment of this application, each of the group transaction data in the proposal block may be executed according to the sequence in which the group transaction data are packetized. Of course, in this embodiment of this application, each of the group transaction data in the proposal block may also be executed randomly.

In some embodiments, assuming that the quantity of group transaction data is S and S is a positive integer greater than 1, then the process of executing each of the group transaction data in the proposal block to obtain the executed transaction execution result may include: k-th group transaction data in the proposal block is acquired, and the k-th group transaction data is executed to obtain the transaction execution result corresponding to the k-th group transaction data. k is a positive integer increasing in sequence, and k is less than S. When the transaction execution result corresponding to the k-th group transaction data is a transaction execution success result, (k+1)-th group transaction data in the proposal block is executed. When the transaction execution result corresponding to the k-th group transaction data is a transaction execution failure result, transaction execution results respectively corresponding to the (k+1)-th group transaction data to the S-th group transaction data in the proposal block are determined as transaction execution failure results; and the transaction execution result respectively corresponding to each of the group transaction data is taken as the executed transaction execution result.

In short, in order to improve the working efficiency of the blockchain system, during the process of sequentially executing each of the group transaction data in the proposal block by the consensus node, when the transaction execution result of one of the group transaction data is a transaction execution failure result, transaction execution results of the other group transaction data ranking after the group transaction data may be directly determined as transaction execution failure results without further computing, which can save computing resources. For example, the proposal block includes group transaction data a, group transaction data b, group transaction data c and group transaction data d according to the sequence in which they are packetized, and in this case, when the consensus node executes the proposal block, the group transaction data a is executed first. Assuming that the transaction execution result corresponding to the group transaction data a is a transaction execution success result, then group transaction data b is executed. Assuming that the transaction execution result corresponding to the group transaction data b is a transaction execution failure result, then the consensus node does not need to execute the group transaction data c and the group transaction data d, and may directly determine the transaction execution results respectively corresponding to the group transaction data c and the group transaction data d as transaction execution failure results. At this time, the executed transaction execution result is: the transaction execution success result corresponding to the group transaction data a, the transaction execution failure result corresponding to the group transaction data b, the transaction execution failure result corresponding to the group transaction data c, and the transaction execution failure result corresponding to the group transaction data d.

In some embodiments, the process of executing the k-th group transaction data may include: a transaction execution function in a smart contract for executing the group transaction data is invoke; historical transaction data for the k-th group transaction data is acquired according to the transaction execution function, and the historical transaction data is determined as read data; and then, the transaction execution function is executed according to the read data and the group transaction data to obtain the transaction execution result of the group transaction data. For example, the group transaction data corresponding to the k-th transaction is that Party A transfers 10 yuan to Party B through his own account, the transaction execution function k corresponding to the k-th group transaction data is a transfer execution function, the historical transaction data k corresponding to the k-th group transaction data is that the balance of Party A is 20 yuan, and then the transaction execution result k for the k-th group transaction data may be 20−10=10 yuan, that is, after the transaction k is executed, the balance of Party A is 10 yuan.

Step S103: Update, when the executed transaction execution result includes a transaction execution failure result, a transaction execution result corresponding to each of the group transaction data to the transaction execution failure result, and update the proposal block according to the transaction execution failure result corresponding to each of the group transaction data to obtain a target proposal block.

For example, the transactions belonging to the same transaction group are supposed to be executed successfully or unsuccessfully at the same time. Therefore, only when the executed transaction execution result does not include the transaction execution failure result, can the consensus node update the proposal block according to the executed transaction execution result. When the executed transaction execution result includes one or more transaction execution results, the consensus node updates the transaction execution result corresponding to each of the group transaction data to the transaction execution failure result, and then updates the proposal block according to the transaction execution failure result corresponding to each of the group transaction data to obtain the target proposal block. For example, the executed transaction execution result obtained in step S102 is: the transaction execution success result corresponding to the group transaction data a, the transaction execution failure result corresponding to the group transaction data b, the transaction execution failure result corresponding to the group transaction data c, and the transaction execution failure result corresponding to the group transaction data d. At this time, the consensus node updates the transaction execution success result corresponding to the group transaction data the transaction execution failure result. In this case, the transaction execution result corresponding to each of the group transaction data is the transaction execution failure result.

In some embodiments, the updating the proposal block according to the transaction execution failure result corresponding to each of the group transaction data to obtain a target proposal block includes: a result Merkle tree is generated according to the transaction execution failure result corresponding to each of the group transaction data, the result Merkle tree including a root hash value; and then the root hash value is added a block header of the proposal block to obtain the target proposal block.

The result Merkle tree is a Merkle tree (also known as hash tree), which is a data structure, i.e., binary tree. The Merkle tree includes roots, branches (non-leaf nodes in the middle) and leaf nodes. All nodes store hash values of related data (not related data itself), for example, root nodes store root hash value, not data of roots themselves.

Step S104: Perform, when the target proposal block is passed by consensus, accounting on the target proposal block and the transaction execution failure result corresponding to each of the group transaction data.

For example, the accounting processing refers to adding and storing the group transaction data in the target proposal block and the transaction execution failure result corresponding to each of the group transaction data into the blockchain ledger.

In some embodiments, the consensus node may broadcast the proposal block to a communicable consensus node in a consensus network. The communicable consensus node is configured to execute each of the group transaction data in the proposal block and then update the proposal block according to the transaction execution result corresponding to each of the group transaction data to obtain a communicable target proposal block. The consensus node receives a block hash value of the communicable target proposal block transmitted by the communicable consensus node, and at the same time, may also broadcast a block hash value of the target proposal block to the communicable consensus node in the consensus network. The consensus node determines the block hash value of the communicable target proposal block as a to-be-matched block hash value, and then compares the to-be-matched block hash value with the block hash value of the target proposal block. When a quantity of the to-be-matched block hash values that are the same as the block hash values of the target proposal blocks is greater than a consensus quantity threshold, it is determined that the target proposal block is passed by consensus.

According to the method provided in this embodiment of this application, the plurality of transactions having the same group identifier in the transaction pool may be determined as the group transaction data; then each of the group transaction data is packetized into the proposal block, and each of the group transaction data in the proposal block is executed to obtain the executed transaction execution result; when the executed transaction execution result includes a transaction execution failure result, then the transaction execution result corresponding to each of the group transaction data is updated to the transaction execution failure result, and the proposal block is updated according to the transaction execution failure result corresponding to each of the group transaction data to obtain the target proposal block; and finally, when the target proposal block is passed by consensus, accounting processing is performed on the target proposal block and the transaction execution failure result corresponding to each of the group transaction data. By using the transaction data having the same group identifier as the group transaction data and binding the transaction execution result of each of the group transaction data, all the transactions generated under the multi-party collaboration transaction are executed successfully or unsuccessfully at the same time, which can prevent, after a part of the group transaction data generated under the multi-party collaboration transaction are executed unsuccessfully, a part of the group transaction data with successful transactions from being written into the blockchain. Therefore, only when all the group transaction data are executed successfully, can the blockchain-based multi-party collaboration transaction be successful, thereby improving the accuracy of transaction data in the blockchain.

Figure 4:
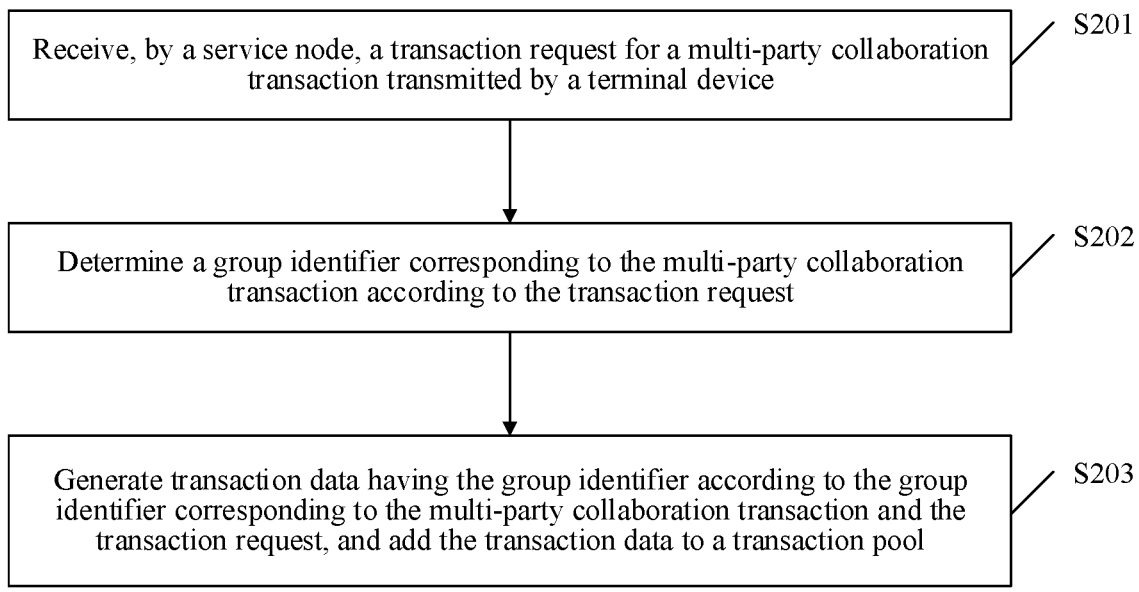
FIG. 4 is a schematic flowchart of a blockchain-based data processing method according to an embodiment of this application.

Referring to FIG. 4, FIG. 4 is a schematic flowchart of a blockchain-based data processing method according to an embodiment of this application. The method may be executed by a service node (e.g., the service node in the embodiment corresponding to FIG. 1), or jointly executed by a service node, a consensus node (e.g., the consensus node in the embodiment corresponding to FIG. 1) and a terminal device (e.g., the terminal device in the embodiment corresponding to FIG. 1). The following is an example in which the method is executed by a service node. The blockchain-based data processing method may at least include step S201 to step S203 as follows:

Step S201: Receive, by a service node, a transaction request for a multi-party collaboration transaction transmitted by a terminal device.

In some embodiments, the multi-party collaboration transaction refers to a transaction that is jointly conducted and completed by a plurality of participants. The multi-party collaboration transaction generates a plurality of transaction requests. These transaction requests may be initiated by the same terminal device or by different terminal devices. The transaction requests generated by the multi-party collaboration transaction may also be transmitted to different service nodes. For the convenience of understanding, the subsequent steps are illustrated by sending the transaction requests to the same service node only.

Step S202: Determine a group identifier corresponding to the multi-party collaboration transaction according to the transaction request.

In some embodiments, there are a plurality of the transaction requests, and each transaction request includes an execution sequence identifier. The process of determining a group identifier corresponding to the multi-party collaboration transaction according to the transaction request may include: when a transaction request with the execution sequence identifier indicating the highest sequential priority is acquired, the transaction request with the highest sequential priority is determined as a group identifier request; and then hash processing is performed on the group identifier request to obtain a request hash value, and the request hash value is determined as the group identifier corresponding to the multi-party collaboration transaction.

For example, the execution sequence identifier is used for indicating the sequence in which the transaction request is executed, and the transaction request of the highest priority refers to the transaction request that is executed first as indicated by the execution sequence identifier.

In some embodiments, when the transaction request includes a collaboration transaction initiating object that initiates the multi-party collaboration transaction, the process of determining a group identifier corresponding to the multi-party collaboration transaction according to the transaction request may further include: the collaboration transaction initiating object is acquired from the transaction request; then an identity identifier corresponding to the collaboration transaction initiating object is searched for in an identity identifier library; and the group identifier corresponding to the multi-party collaboration transaction is generated according to the identity identifier.

The collaboration transaction initiating object may refer to the initiating object of the multi-party collaboration transaction, for example, Party A when two people sign a contract. The identity identifier library is used for storing the identity identifier of each transaction object (i.e., the initiating object of the multi-party collaboration transaction). The identity identifier of the transaction object may be the identity identifier assigned by the service node after the transaction object initiates an identity identifier acquisition request to the service node before initiating a transaction request. The transaction object refers to an object that can initiate a transaction request. Any transaction object can be used as a collaboration transaction initiating object, and invite other transaction objects to participate in the multi-party collaboration transaction. The identity identifier is unique, i.e., one transaction object corresponds to one identity identifier, and different transaction objects correspond to different identity identifiers. The process of generating the group identifier corresponding to the multi-party collaboration transaction according to the identity identifier may include: the service node acquires a current timestamp, and then adds the current timestamp after the identity identifier, thereby obtaining a unique identifier, which can be used as the group identifier corresponding to the multi-party collaboration transaction.

In some embodiments, before initiating a transaction request for a multi-party collaboration transaction, the terminal device may first apply for a corresponding group identifier for the multi-party collaboration transaction; and then, when initiating the transaction request for the multi-party collaboration transaction, the terminal device may directly carry the applied group identifier. The specific implementation process of applying for the group identifier may include: the service node acquires an identifier acquisition request for the multi-party collaboration transaction initiated by the collaboration transaction initiating object. The identifier acquisition request includes a transaction object that participates in the multi-party collaboration transaction. Then, the service node may generate an available group identifier for the multi-party collaboration transaction according to the identifier acquisition request, and then transmit the available group identifier to the terminal device corresponding to the transaction object, such that the terminal device corresponding to the transaction object generates the transaction request including the available group identifier. At this time, the process of generating the group identifier corresponding to the multi-party collaboration transaction according to the transaction request may include: the available group identifier in the transaction request is determined as the group identifier corresponding to the multi-party collaboration transaction.

For example, the terminal device may also directly transmit a group identifier application request (i.e., identifier acquisition request) to the service node, then receive a QR code image sent by the service node, and obtain the group identifier by scanning the QR code image, and then, the transaction request including the available group identifier is generated according to the group identifier.

For example, before the group identifier corresponding to the multi-party collaboration transaction is determined, the validity of the transaction request may be verified first. The transaction request usually carries signature data, which is obtained after the terminal device performs signature processing on the transaction request through a private key. The service node acquires a public key corresponding to the terminal device, and then performs signature verification on the signature data through the public key to obtain a signature verification result. When the signature verification result is a successful signature verification result, it is determined that the transaction request is valid, and further, the group identifier corresponding to the multi-party collaboration transaction is determined.

Step S203: Generate transaction data having the group identifier according to the group identifier corresponding to the multi-party collaboration transaction and the transaction request, and add the transaction data to a transaction pool.

In some embodiments, a plurality of transactions having the same group identifier in the transaction pool are determined by the consensus node as group transaction data. The consensus node packetizes each of the group transaction data into a proposal block, and executes each of the group transaction data in the proposal block in sequence to obtain an executed transaction execution result. When the executed transaction execution result includes a transaction execution failure result, the consensus node updates a transaction execution result corresponding to each of the group transaction data to the transaction execution failure result.

According to the method provided in this embodiment of this application, the unique group identifier of the multi-party collaboration transaction may be generated. Since each of the transaction data generated by the transaction request generated during the multi-party collaboration transaction carries the group identifier and sent into the transaction pool, the plurality of transactions having the same group identifier in the transaction pool are determined by the consensus node as the group transaction data. The transaction execution results of each group transaction data are related to each other. As long as the transaction execution result of one of the group transaction data is the transaction execution failure result, the transaction execution results of the rest group transaction data will be updated to the transaction execution failure results, thereby ensuring that all the transactions generated under the multi-party collaboration transaction are executed successfully or unsuccessfully at the same time, which can prevent, after a part of the group transaction data generated under the multi-party collaboration transaction are executed unsuccessfully, a part of the group transaction data with successful transactions from being written into the blockchain. Therefore, only when all the group transaction data are executed successfully, can the blockchain-based multi-party collaboration transaction be successful, thereby improving the accuracy of transaction data in the blockchain.

Figure 5:
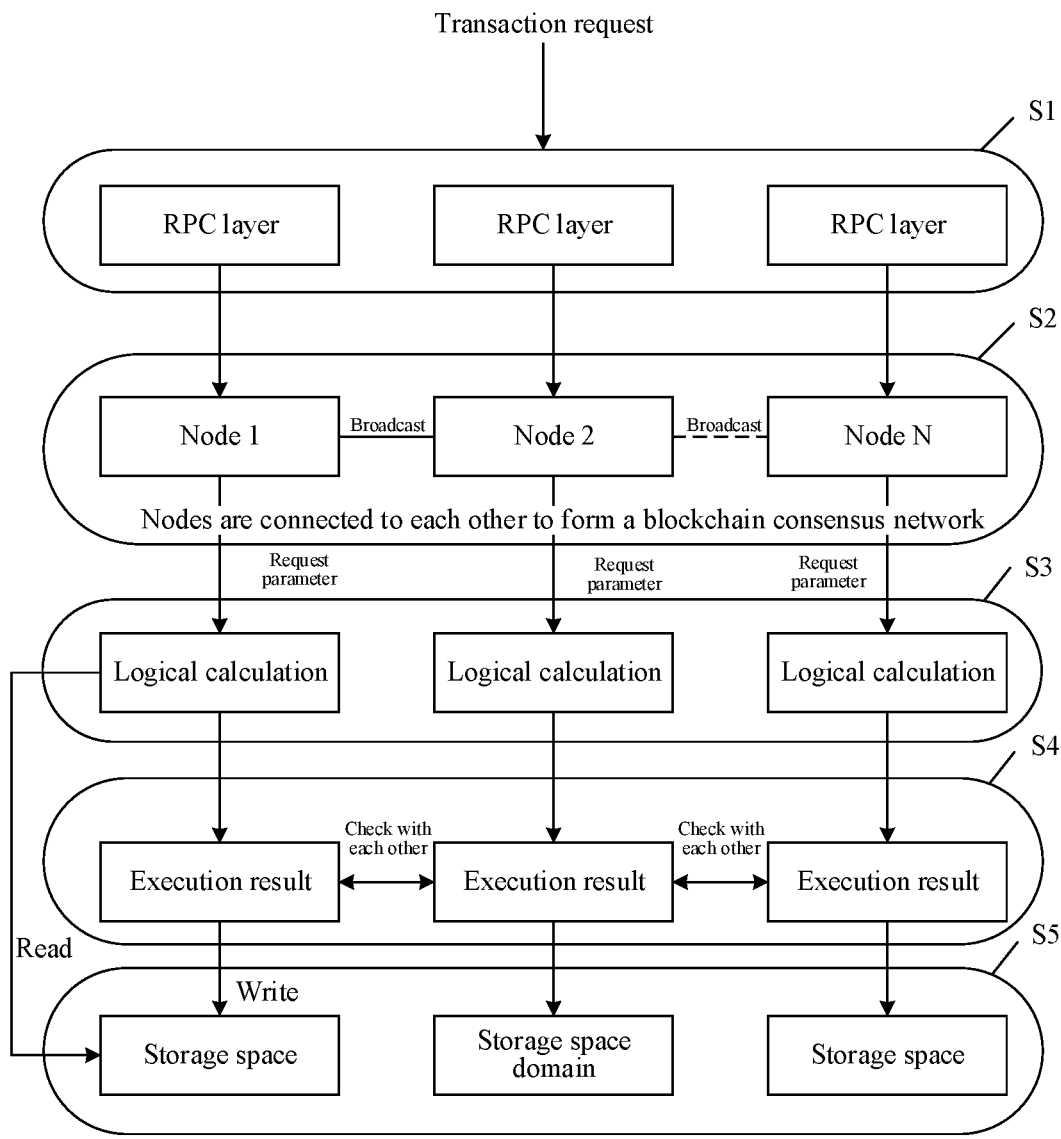
FIG. 5 is a schematic flowchart of a group transaction data execution method according to an embodiment of this application.

For the above process, reference may also be made to FIG. 5. FIG. 5 is a schematic flowchart of a group transaction data execution method according to an embodiment of this application. The method may be executed by any node (which may be the service node shown in FIG. 1, or the consensus node shown in FIG. 1) in the blockchain network.

As shown in FIG. 5, the group transaction data execution method may include step S1 to step S5 as follows:

Step S1: Acquire, by a remote procedure call (RPC) layer in each node, a transaction request.

In some embodiments, the transaction request may carry the group identifier, and may also carry basic information of the multi-party collaboration transaction, so that the node can acquire the group identifier for the transaction request.

Step S2: Broadcast, by each node, transactions to each other, packetize, by one of the nodes that serves as a block producer, a plurality of transactions into a block, and broadcast the block to the other nodes.

The block producer is selected depending on the consensus algorithm. For example, the leader node may serve as the block producer, or every node may serve as the block producer in turn, or the block producer is selected according to the hashrate.

In some embodiments, the node that acquires the transaction request through the RPC layer may generate transaction data (i.e., data of transaction) having the group identifier, broadcast the transaction data to each other and add the transaction data into the transaction pool. When packetizing a plurality of transactions into a block, the block producer may treat the transaction data having the same group identifier as the group transaction data of the same group.

Step S3: Start, by each node, to execute the transactions in the block and perform logical calculations after receiving the block. On a logical calculation layer, transaction parameters are analyzed, and the contract is executed During the execution process, it may be necessary to read data in the storage space (i.e., read data). For example, in FIG. 5, Node 1 reads historical transaction data from the storage space.

In some embodiments, when executing the transactions in the block, each node will treat the group transaction data in the same group as a whole, execute each of the group transaction data in the group in sequence to obtain an executed transaction execution result, and update, if the executed transaction execution result includes a transaction execution failure result, a transaction execution result corresponding to each of the group transaction data in the group to the transaction execution failure result, thereby ensuring that all the group transaction data in the group are executed successfully or unsuccessfully at the same time.

Step S4: Check, by each node, the execution result (i.e., the transaction execution result corresponding to each of the group transaction data) with each other after the contract is executed. The checking method may include: The execution results or changes to the storage are organized into a result Merkle tree, the root of the result tree (i.e., result root hash) is placed into the block header, and finally the consistency of the block hash of each node is checked.

Step S5: Write, by each node, related data of this block into the storage space after the consensus is reached successfully.

The related data include a block header, all transactions included in the block, a contract execution result, etc.

For the detailed process of step S1 to step S5, reference may be made to the embodiment corresponding to FIG. 3 and the embodiment corresponding to FIG. 4, and details are not described herein again.

Figure 6:
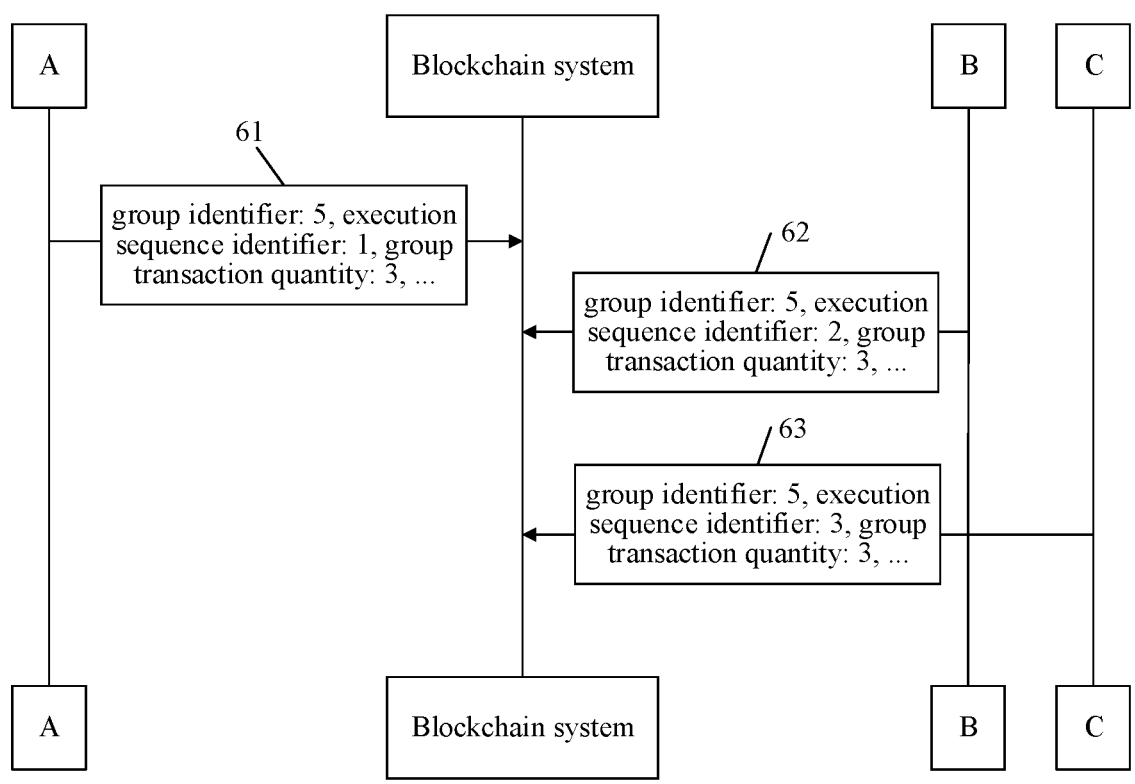
FIG. 6 is a schematic diagram showing a transaction group implementation scenario according to an embodiment of this application.

Referring to FIG. 6, FIG. 6 is a schematic diagram showing a transaction group implementation scenario according to an embodiment of this application. Assuming that Participant A, Participant B and Participant C participate in a multi-party collaboration transaction, Participant A generates a transaction a, Participant B generates a transaction a transaction b, and Participant C generates a transaction c. In the method provided by this embodiment of this application, the three transactions may be added to a same transaction group. When executing transactions and consensus, the blockchain system treats the transaction group as the smallest execution unit. All the transactions in one transaction group are supposed to be successful at the same time, to ensure that Participant A, Participant B and Participant C all receive money transferred from each other; or to be successful at the same time, such that the money will be returned to its owner and neither party will suffer losses.

As shown in FIG. 6, a group number field may be added to the transaction request corresponding to the transaction. For example, the group number field in the transaction request 61 corresponding to the transaction a is "group identifier: 5, execution sequence identifier: 1, group transaction quantity: 3", which means that the group identifier of the transaction group to which the transaction request 61 belongs is 5, the transaction group includes three transactions and the transaction a corresponding to the transaction request 61 is the first transaction in the transaction group. Similarly, the group number field in the transaction request 62 corresponding to the transaction b is "group identifier: 5, execution sequence identifier: 2, group transaction quantity: 3", which means that the group identifier of the transaction group to which the transaction request 62 belongs is 5, the transaction group includes three transactions and the transaction b corresponding to the transaction request 62 is the second transaction in the transaction group. The group number field in the transaction request 63 corresponding to the transaction c is "group identifier: 5, execution sequence identifier: 3, group transaction quantity: 3", which means that the group identifier of the transaction group to which the transaction request 63 belongs is 5, the transaction group includes three transactions and the transaction c corresponding to the transaction request 63 is the third transaction in the transaction group. The execution sequence identifiers may be determined jointly by the three participants in advance or based on the time when the transaction request is initiated, which is not limited here. Participant A, Participant B and Participant C may acquire the group identifier for this multi-party collaboration transaction by various methods, such as the method for acquiring the group identifier described in step S202 of the embodiment corresponding to FIG. 4 above.

As shown in FIG. 6, after acquiring the group identifier, each participant sends the respective transaction request, obtains signature data with his own private key signature, and then sends the transaction request and the signature data together into the blockchain system. After verifying the received transaction request through the signature data, the blockchain system generates corresponding transaction data, and then packetizes the transaction data having the same group identifier into the same proposal block as the group transaction data. It is to be understood that if not all the transaction data in one transaction group are collected, the blockchain system will wait for some time. Then, the blockchain system executes the proposal block, and executes the transactions in units of transaction groups. Any transaction execution failure in the transaction group can be considered as a failure of this transaction group, and the transaction execution result of the group transaction data corresponding to each transaction will be updated to the transaction failure result. Finally, the blockchain system performs consensus and storage on the executed proposal block. The acquisition of the group identifier may also be completed through the blockchain system, i.e., the participants of the multi-party collaboration transaction do not need to acquire the group identifier, but the transaction request is sent to the blockchain system and the group identifier is assigned by the blockchain system.

Figure 7:
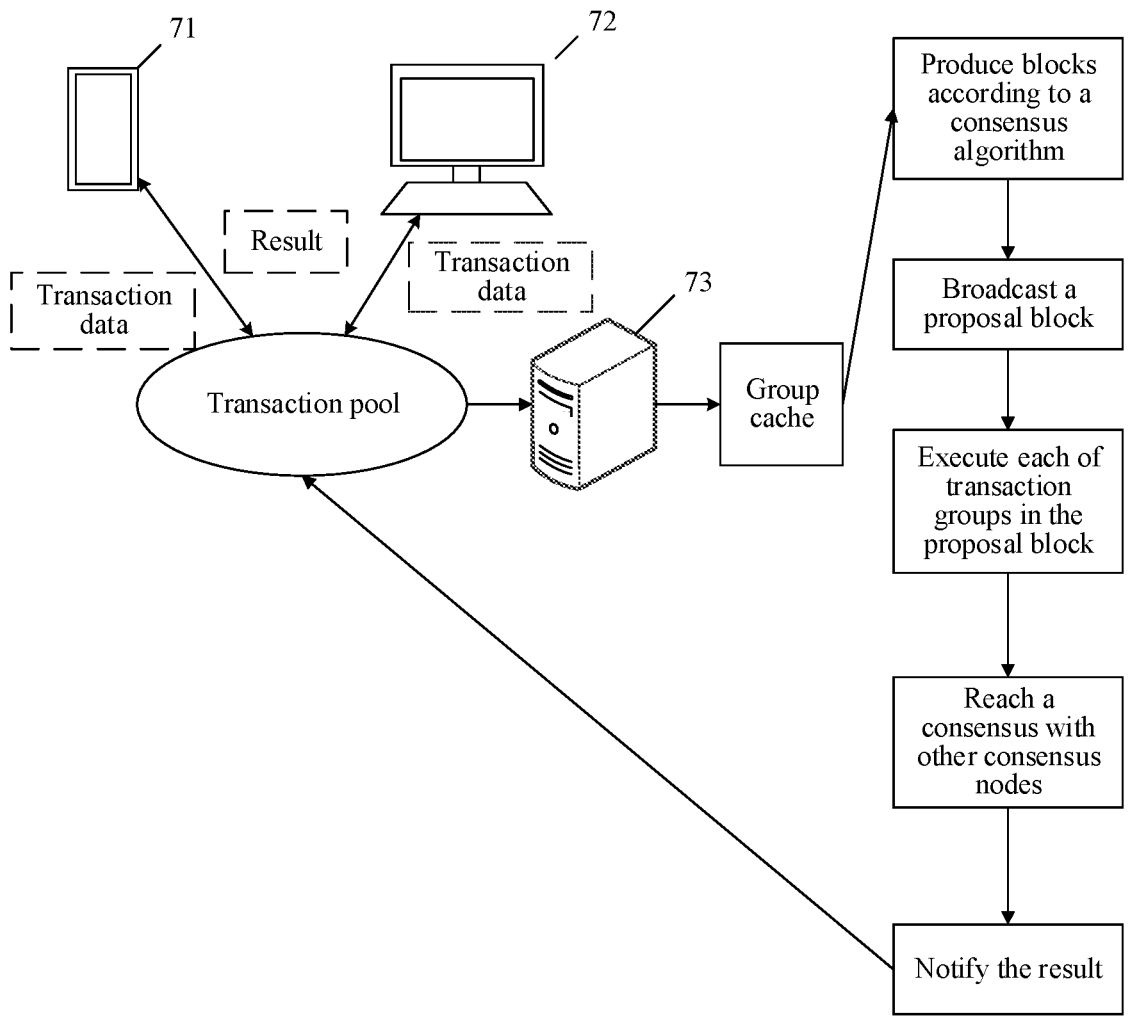
FIG. 7 is a schematic flowchart showing transaction group implementation according to an embodiment of this application.

For a better understanding of the transaction group implementation process, reference may be made to FIG. 7. FIG. 7 is a schematic flowchart showing transaction group implementation according to an embodiment of this application. As shown in FIG. 7, the transaction data corresponding to the transactions generated by a terminal device 71 and a terminal device 72 may be placed into the transaction pool until they are packetized to the proposal block by a consensus node 73 that serves as a block producer. The consensus node 73 produces blocks according to a consensus algorithm, during which the transaction data having the same group identifier are cached into a group cache queue until the transaction data corresponding to all the transactions in the transaction group corresponding to the group identifier are acquired. Then, all the transaction data in the complete group are packetized into the proposal block as group transaction data. Then, the consensus node 73 broadcasts the proposal block to other consensus nodes in the blockchain system. The consensus node 73 executes the group transaction data corresponding to each transaction group in the proposal block. For the specific execution process, reference may be made to the description for the embodiment corresponding to FIG. 3 above, and details are not described herein again. After executing the proposal block and reaches a consensus on the proposal block with the other consensus nodes, the consensus node 73 notifies the result to the terminal device 71 and the terminal device 72.

Figure 8:
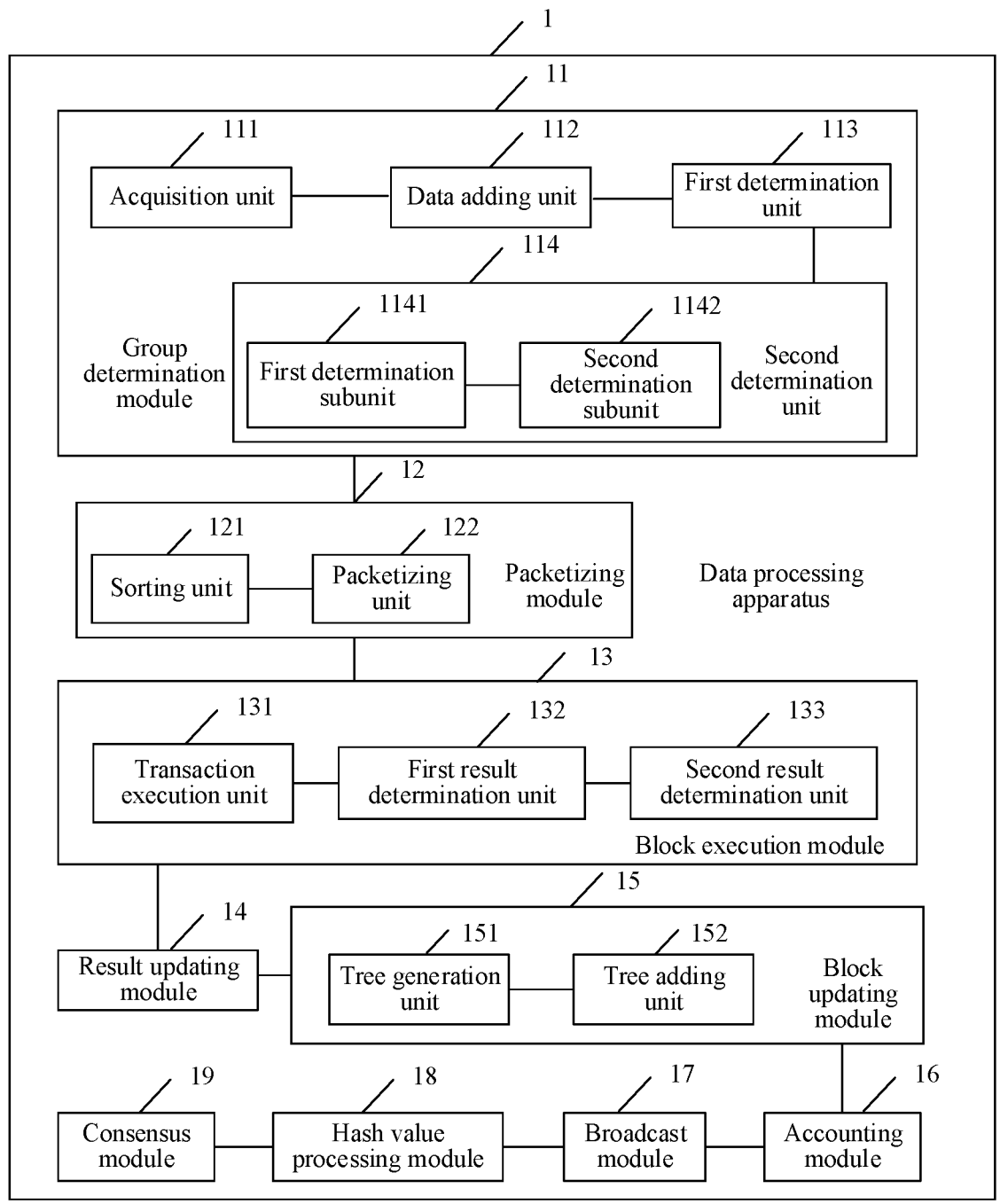
FIG. 8 is a schematic structural diagram of a blockchain-based data processing apparatus according to an embodiment of this application.

FIG. 8 is a schematic structural diagram of a blockchain-based data processing apparatus according to an embodiment of this application. The data processing apparatus may be a computer program (including a program code) running in a computer device. For example, the data processing apparatus is an application. The apparatus may be configured to execute corresponding steps in the data processing method according to the embodiment of this application. As shown in FIG. 8, the data processing apparatus 1 may include: a group determination module 11, a packetizing module 12, a block execution module 13, a result updating module 14, a block updating module 15 and an accounting module 16.

The group determination module 11 is configured to determine a plurality of transactions having a same group identifier in a transaction pool as group transaction data.

The packetizing module 12 is configured to packetize each of the group transaction data into a proposal block.

The block execution module 13 is configured to packetize each of the group transaction data into the proposal block and execute each of the group transaction data in the proposal block to obtain an executed transaction execution result.

The result updating module 14 is configured to update, when the executed transaction execution result includes a transaction execution failure result, a transaction execution result corresponding to each of the group transaction data to the transaction execution failure result.

The block updating module 15 is configured to update the proposal block according to the transaction execution failure result corresponding to each of the group transaction data to obtain a target proposal block.

The accounting module 16 is configured to perform, when the target proposal block is passed by consensus, accounting on the target proposal block and the transaction execution failure result corresponding to each of the group transaction data.

For the specific implementations of the group determination module 11, the packetizing module 12, the block execution module 13, the result updating module 14, the block updating module 15 and the accounting module 16, reference may be made to the description for step S101 to step S104 in the embodiment corresponding to FIG. 3 above, and details are not described herein again.

Referring to FIG. 8, the group determination module 11 may include: an acquisition unit 111, a data adding unit 112, a first determination unit 113 and a second determination unit 114.

The acquisition unit 111 is configured to acquire the transaction data from a transaction pool. The transaction data includes a group identifier and a group transaction quantity. The data adding unit 112 is configured to add the transaction data to a group cache queue corresponding to the group identifier to obtain an updated group cache queue. The first determination unit 113 is configured to determine, when a quantity of transaction data in the updated group cache queue is equal to the group transaction quantity, the transaction data in the updated group cache queue as the group transaction data. The second determination unit 114 is configured to acquire, when the quantity of transaction data in the updated group cache queue is less than the group transaction quantity, new transaction data including the group identifier from the transaction pool.

For the specific implementations of the acquisition unit 111, the data adding unit 112, the first determination unit 113 and the second determination unit 114, reference may be made to the description for step S101 in the embodiment corresponding to FIG. 3 above, and details are not described herein again.

Referring to FIG. 8, the second determination unit 114 may include: a first determination subunit 1141 and a second determination subunit 1142.

The first determination subunit 1141 is configured to acquire, when the quantity of transaction data in the updated group cache queue is less than the group transaction quantity and a current time is within a cache time period, new transaction data including the group identifier from the transaction pool. The second determination subunit 1142 is configured to place, when the quantity of transaction data in the updated group cache queue is less than the group transaction quantity and the current time exceeds the cache time period, the transaction data in the updated group cache queue back into the transaction pool, and empty the updated group cache queue.

For the specific implementations of the first determination subunit 1141 and the second determination subunit 1142, reference may be made to the description for step S101 in the embodiment corresponding to FIG. 3 above, and details are not described herein again.

Each of the group transaction data includes an execution sequence identifier. Referring to FIG. 8, the packetizing module 12 may include: a sorting unit 121 and a packetizing unit 122.

The sorting unit 121 is configured to sort each of the group transaction data according to the execution sequence identifier included in each of the group transaction data to obtain the sorted group transaction data. The packetizing unit 122 is configured to packetize the sorted group transaction data into the proposal block.

For the specific implementations of the sorting unit 121 and the packetizing unit 122, reference may be made to the description for step S102 in the embodiment corresponding to FIG. 3 above, and details are not described herein again.

A quantity of the group transaction data is S, and S is a positive integer greater than 1. Referring to FIG. 8, the block execution module 13 may include: a transaction execution unit 131, a first result determination unit 132 and a second result determination unit 133.

The transaction execution unit 131 is configured to acquire k-th group transaction data in the proposal block, and execute the k-th group transaction data to obtain a transaction execution result corresponding to the k-th group transaction data. k is a positive integer increasing in sequence, and k is less than S. The first result determination unit 132 is configured to execute, when the transaction execution result corresponding to the k-th group transaction data is a transaction execution success result, (k+1)-th group transaction data in the proposal block. The second result determination unit 133 is configured to determine, when the transaction execution result corresponding to the k-th group transaction data is a transaction execution failure result, transaction execution results respectively corresponding to the (k+1)-th group transaction data to the S-th group transaction data in the proposal block as transaction execution failure results.

For the specific implementations of the transaction execution unit 131, the first result determination unit 132 and the second result determination unit 133, reference may be made to the description for step S102 in the embodiment corresponding to FIG. 3 above, and details are not described herein again.

Referring to FIG. 8, the block updating module 15 may include: a tree generation unit 151 and a tree adding unit 152.

The tree generation unit 151 is configured to generate a result Merkle tree according to the transaction execution failure result corresponding to each of the group transaction data. The result Merkle tree includes a root hash value. The tree adding unit 152 is configured to add the root hash value to a block header of the proposal block to obtain the target proposal block.

For the specific implementations of the tree generation unit 151 and the tree adding unit 152, reference may be made to the description for step S103 in the embodiment corresponding to FIG. 3 above, and details are not described herein again.

Referring to FIG. 8, the data processing apparatus 1 may further include: a broadcast module 17, a hash value processing module 18 and a consensus module 19.

The broadcast module 17 is configured to broadcast the proposal block to a communicable consensus node in a consensus network. The communicable consensus node is configured to execute each of the group transaction data in the proposal block and update the proposal block according to the transaction execution result corresponding to each of the group transaction data to obtain a communicable target proposal block. The hash value processing module 18 is configured to receive a block hash value of the communicable target proposal block transmitted by the communicable consensus node, and determine the block hash value of the communicable target proposal block as a to-be-matched block hash value. The consensus module 19 is configured to determine, when a quantity of the to-be-matched block hash values that are the same as the block hash values of the target proposal blocks is greater than a consensus quantity threshold, that the target proposal block is passed by consensus.

For the specific implementations of the broadcast module 17, the hash value processing module 18 and the consensus module 19, reference may be made to the description for step S104 in the embodiment corresponding to FIG. 3 above, and details are not described herein again.

Figure 9:
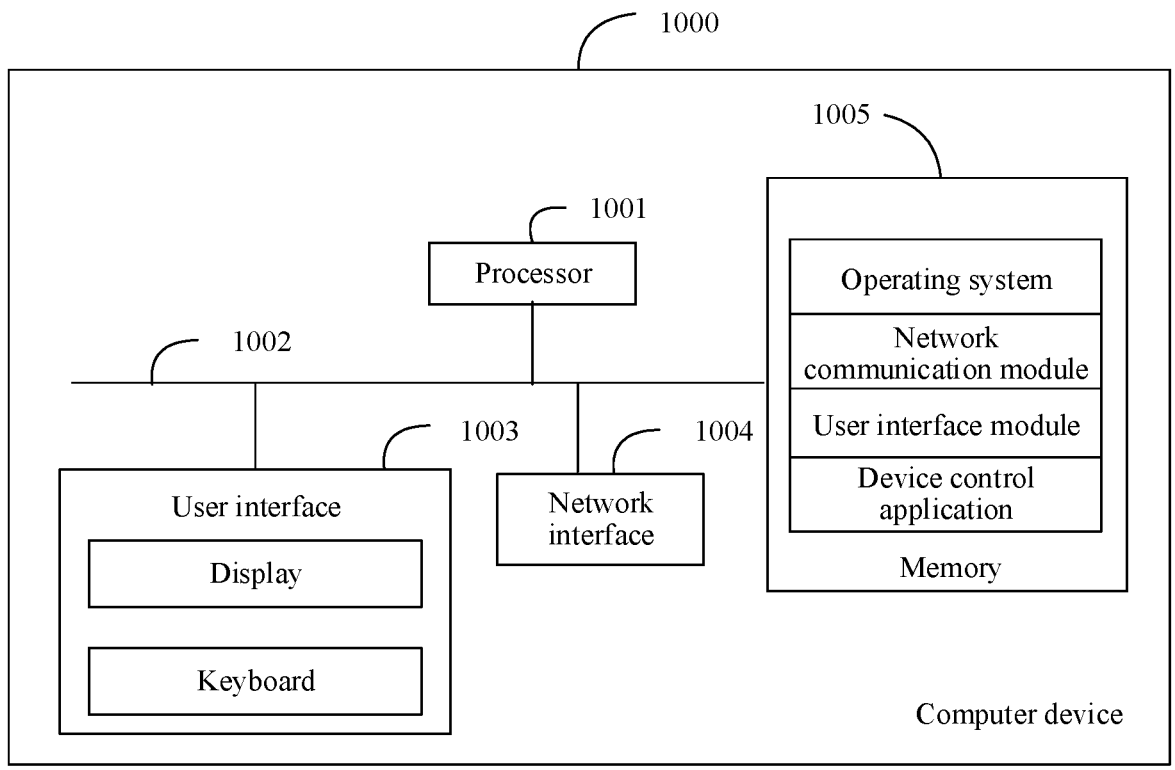
FIG. 9 is a schematic structural diagram of a computer device according to an embodiment of this application.

Referring to FIG. 9, FIG. 9 is a schematic flowchart of a computer device according to an embodiment of this application. As shown in FIG. 9, the data processing apparatus 1 in the embodiment corresponding to FIG. 8 may be applied to the computer device 9000. The computer device 9000 may include: a processor 9001, a network interface 9004 and a memory 9005. Besides, the computer device 9000 further includes: a user interface 9003 and at least one communication bus 9002. the communications bus 9002 is configured to implement connection and communication between these components. The user interface 9003 may include a display and a keyboard. In some embodiments, the user interface 9003 may further include a standard wired interface and a standard wireless interface. The network interface 9004 may include a standard wired interface and a standard wireless interface (such as a Wi-Fi interface). The memory 9005 may be a high-speed RAM memory, or a non-volatile memory, for example, at least one magnetic disk storage. The memory 9005 may alternatively be at least one storage apparatus located away from the processor 9001. As shown in FIG. 9, the memory 9005 used as a computer-readable storage medium may include an operating system, a network communication module, a user interface module, and a device control application.

In the computer device 9000 shown in FIG. 9, the network interface 9004 may provide a network communication function. The user interface 9003 is mainly configured to provide an input interface for users. The processor 9001 may be configured to invoke a device control application stored in the memory 9005, and perform the following operations:

> determining, by a consensus node, a plurality of transactions having a same group identifier in a transaction pool as group transaction data;
>
> packetizing each of the group transaction data into a proposal block, and executing each of the group transaction data in the proposal block to obtain an executed transaction execution result;
>
> updating, when the executed transaction execution result includes a transaction execution failure result, a transaction execution result corresponding to each of the group transaction data to the transaction execution failure result, and updating the proposal block according to the transaction execution failure result corresponding to each of the group transaction data to obtain a target proposal block; and
>
> performing, when the target proposal block is passed by consensus, accounting on the target proposal block and the transaction execution failure result corresponding to each of the group transaction data.

It is to be understood that the computer device 1000 described in this embodiment of this application may execute the description for the data processing method in the embodiments above, or the description for the data processing apparatus 1 in the embodiments corresponding to FIG. 8 above, and details are not described herein again. In addition, the description of beneficial effects of the same method are not described herein again.

An embodiment of this application further provides a non-transitory computer-readable storage medium. The computer-readable storage medium stores the computer program executed by the aforementioned data processing apparatus 1, and can execute the description for the data processing method in any of the embodiments above when the processor loads and executes the computer program, so details are not described herein again. In addition, the description of beneficial effects of the same method are not described herein again. For technical details that are not disclosed in the computer-readable storage medium embodiments of this application, reference may be made to the description for the method embodiments of this application.

Figure 10:
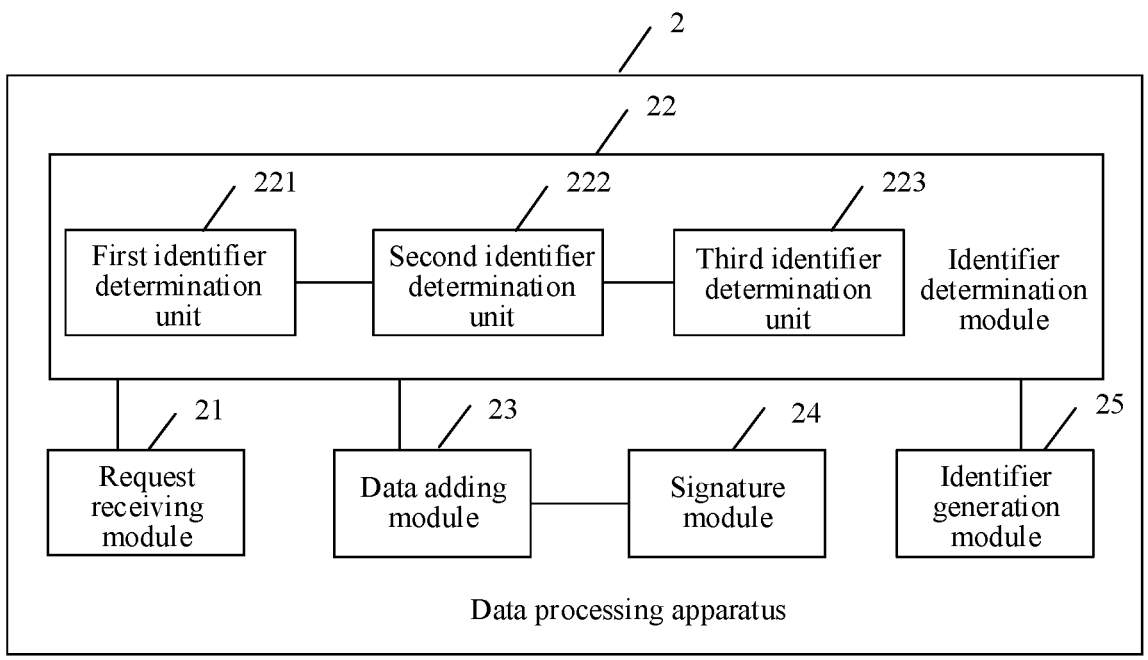
FIG. 10 is a schematic structural diagram of another blockchain-based data processing apparatus according to an embodiment of this application.

Referring to FIG. 10, FIG. 10 is a schematic structural diagram of another blockchain-based data processing apparatus according to an embodiment of this application. The data processing apparatus may be a computer program (including a program code) running in a computer device. For example, the data processing apparatus is an application. The data processing apparatus may be configured to execute corresponding steps in the data processing method according to the embodiment of this application. As shown in FIG. 10, the data processing apparatus 2 may include: a request receiving module 21, an identifier determination module 22 and a data adding module 23.

The request receiving module 21 is configured to receive a transaction request for a multi-party collaboration transaction transmitted by a terminal device.

The identifier determination module 22 is configured to determine a group identifier corresponding to the multi-party collaboration transaction according to the transaction request.

The data adding module 23 is configured to generate transaction data having the group identifier according to the group identifier corresponding to the multi-party collaboration transaction and the transaction request, and add the transaction data to a transaction pool.

The transaction pool has a plurality of transactions having a same group identifier, the transaction data is used for a consensus node to be determined as group transaction data, and the consensus node is configured to packetize each of the group transaction data into a proposal block and execute each of the group transaction data in the proposal block to obtain an executed transaction execution result. The consensus node is further configured to update, when the executed transaction execution result includes a transaction execution failure result, a transaction execution result corresponding to each of the group transaction data to the transaction execution failure result.

For the specific implementations of the request receiving module 21, the identifier determination module 22 and the data adding module 23, reference may be made to the description for step S201 to step S203 in the embodiment corresponding to FIG. 4 above, and details are not described herein again.

The transaction request carries signature data, which is obtained after the terminal device performs signature processing on the transaction request through a private key. Referring to FIG. 10, the data processing apparatus 2 may further include: a signature module 24.

The signature module 24 is configured to acquire a public key corresponding to the terminal device. The signature module 24 is further configured to perform signature verification on the signature data through the public key to obtain a signature verification result. The signature module 24 is further configured to notify, when the signature verification result is a successful signature verification result, the identifier determination module 22 to determine a group identifier corresponding to the multi-party collaboration transaction according to the transaction request.

For the specific implementations of the signature module 24, reference may be made to the description for step S202 in the embodiment corresponding to FIG. 4 above, and details are not described herein again.

There are a plurality of the transaction requests, and each of the transaction requests includes an execution sequence identifier. Referring to FIG. 10, the identifier determination module 22 may include: a first identifier determination unit 221.

The first identifier determination unit 221 is configured to determine, when a transaction request with the execution sequence identifier indicating the highest sequential priority is acquired, the transaction request with the highest sequential priority as a group identifier request. The first identifier determination unit 221 is further configured to perform hash processing on the group identifier request to obtain a request hash value, and determine the request hash value as the group identifier corresponding to the multi-party collaboration transaction.

For the specific implementations of the first identifier determination unit 221, reference may be made to the description for step S202 in the embodiment corresponding to FIG. 4 above, and details are not described herein again.

The transaction request includes a collaboration transaction initiating object that initiates the multi-party collaboration transaction. Referring to FIG. 10, the identifier determination module 22 may include: a second identifier determination unit 222.

The second identifier determination unit 222 is configured to acquire the collaboration transaction initiating object from the transaction request. The second identifier determination unit 222 is further configured to search for an identity identifier corresponding to the collaboration transaction initiating object in an identity identifier library. The second identifier determination unit 222 is further configured to generate the group identifier corresponding to the multi-party collaboration transaction according to the identity identifier.

For the specific implementations of the second identifier determination unit 222, reference may be made to the description for step S202 in the embodiment corresponding to FIG. 4 above, and details are not described herein again.

Referring to FIG. 10, the data processing apparatus 2 may further include: an identifier generation module 25.

The identifier generation module 25 is configured to acquire an identifier acquisition request for the multi-party collaboration transaction initiated by a collaboration transaction initiating object. The identifier acquisition request includes a transaction object participating in the multi-party collaboration transaction. The identifier generation module 25 is further configured to generate an available group identifier for the multi-party collaboration transaction according to the identifier acquisition request. The identifier generation module 25 is further configured to transmit the available group identifier to the terminal device corresponding to the transaction object. The terminal device corresponding to the transaction object generates the transaction request including the available group identifier.

The identifier determination module 22 may include: a third identifier determination unit 223.

The third identifier determination unit 223 is configured to determine the available group identifier in the transaction request as the group identifier corresponding to the multi-party collaboration transaction.

For the specific implementations of the identifier generation module 25 and the third identifier determination unit 223, reference may be made to the description for step S202 in the embodiment corresponding to FIG. 4 above, and details are not described herein again.

Figure 11:
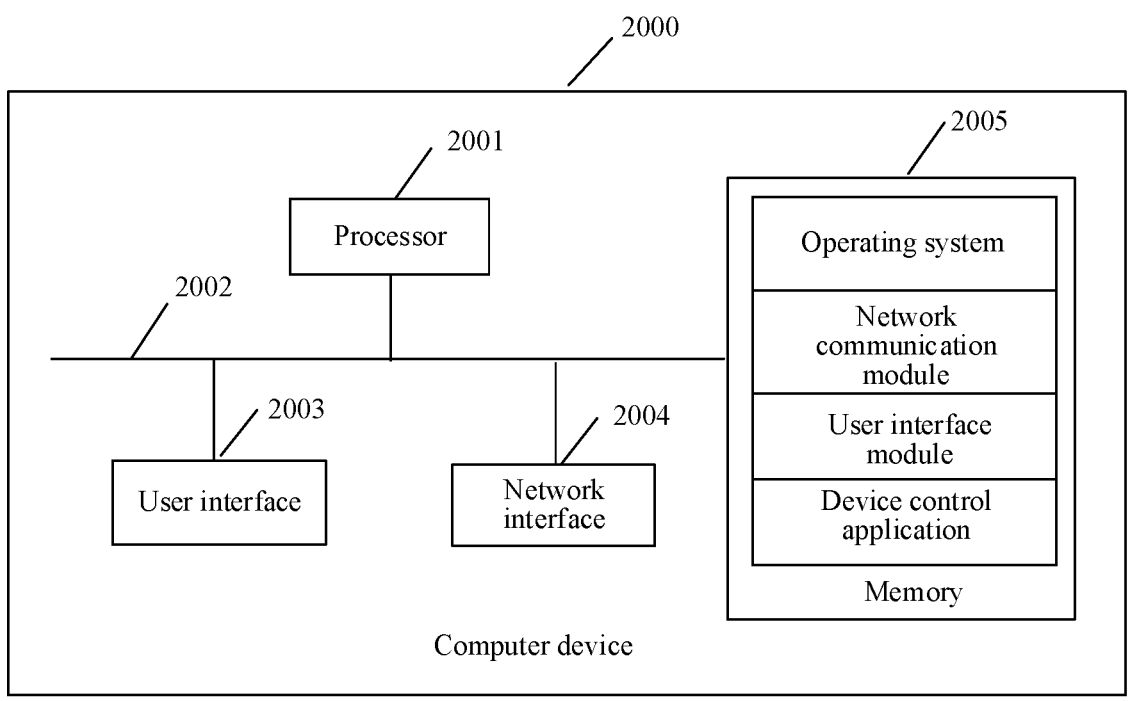
FIG. 11 is a schematic structural diagram of another computer device according to an embodiment of this application.

Referring to FIG. 11, FIG. 11 is a schematic structural diagram of another computer device according to an embodiment of this application. As shown in FIG. 11, the data processing apparatus 2 in the embodiment corresponding to FIG. 10 may be applied to the computer device 2000. The computer device 2000 may include: a processor 2001, a network interface 2004 and a memory 2005. Besides, the computer device 2000 further includes: a user interface 2003 and at least one communication bus 2002. the communications bus 2002 is configured to implement connection and communication between these components. The user interface 2003 may include a display and a keyboard. In some embodiments, the user interface 2003 may further include a standard wired interface and a standard wireless interface. The network interface 2004 may include a standard wired interface and a standard wireless interface (such as a Wi-Fi interface). The memory 2005 may be a high-speed RAM memory, or a non-volatile memory, for example, at least one magnetic disk storage. The memory 2005 may alternatively be at least one storage apparatus located away from the processor 2001. As shown in FIG. 11, the memory 2005 used as a computer-readable storage medium may include an operating system, a network communication module, a user interface module, and a device control application.

In the computer device 2000 shown in FIG. 11, the network interface 2004 may provide a network communication function. The user interface 2003 is mainly configured to provide an input interface for users. The processor 2001 may be configured to invoke a device control application stored in the memory 2005, and perform the following operations:

receiving a transaction request for a multi-party collaboration transaction transmitted by a terminal device;

determining a group identifier corresponding to the multi-party collaboration transaction according to the transaction request; and generating transaction data having the group identifier according to the group identifier corresponding to the multi-party collaboration transaction and the transaction request, and adding the transaction data to a transaction pool.

The transaction pool has a plurality of transactions having a same group identifier, the transaction data is used for a consensus node to be determined as group transaction data, and the consensus node is configured to packetize each of the group transaction data into a proposal block and execute each of the group transaction data in the proposal block to obtain an executed transaction execution result. The consensus node is further configured to update, when the executed transaction execution result includes a transaction execution failure result, a transaction execution result corresponding to each of the group transaction data to the transaction execution failure result.

It is to be understood that the computer device 2000 described in this embodiment of this application may execute the description for the data processing method in the embodiments above, or the description for the data processing apparatus 2 in the embodiments corresponding to FIG. 10 above, and details are not described herein again. In addition, the description of beneficial effects of the same method are not described herein again.

An embodiment of this application further provides a non-transitory computer-readable storage medium. The computer-readable storage medium stores the computer program executed by the aforementioned data processing apparatus 2, and can execute the description for the data processing method in any of the embodiments above when the processor loads and executes the computer program, so details are not described herein again. In addition, the description of beneficial effects of the same method are not described herein again. For technical details that are not disclosed in the computer-readable storage medium embodiments of this application, reference may be made to the description for the method embodiments of this application.

The computer-readable storage medium may be the data processing apparatus provided in any of the foregoing embodiments or an internal storage unit of the computer device, such as a hard disk or an internal memory of the computer device. The computer-readable storage medium may also be an external storage device of the computer device, such as a plug-in hard disk, a Smart Media Card (SMC), a Secure Digital (SD) card, a flash card, etc. provided on the computer device. The computer-readable storage medium may also include both an internal storage unit of the computer device and an external storage device. The computer-readable storage medium is configured to store the computer program and other programs and data required by the computer device. The computer-readable storage medium may also be configured to temporarily store data that has been or will be outputted.

An embodiment of this application further provides a computer program product or a computer program. The computer program product or the computer program includes a computer instruction stored in a computer-readable storage medium. A processor of a computer device reads the computer instruction from the computer-readable storage medium. The processor executes the computer instruction such that the computer device executes the method provided in any of the corresponding embodiments described above.

The terms "first", "second" and the like in this specification, claims, and the accompanying drawings according to the embodiments of this application are used to distinguish different objects and are not used to describe a specific sequence. In addition, the term "include" and any variant thereof are intended to cover a non-exclusive inclusion. For example, a process, method, apparatus, product, or device that includes a series of steps or modules is not limited to the listed steps or modules; and instead, further optionally includes a step or module that is not listed, or further optionally includes another step or unit that is intrinsic to the process, method, apparatus, product, or device.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. A person of ordinary skill in the art may understand that, units and algorithm steps of the examples described in the foregoing disclosed embodiments may be implemented by electronic hardware, computer software, or a combination thereof. To clearly describe the interchangeability between the hardware and the software, the foregoing has generally described compositions and steps of each example based on network elements. Whether these network elements are executed in a mode of hardware or software depends on particular applications and design constraints of the technical solutions. A person skilled in the art may use different methods to implement the described network elements for each particular application, but it is not to be considered that the implementation goes beyond the scope of this application.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A method for processing blockchain-based transactions performed by a computer device acting as a consensus node of a blockchain network, the method comprising:
   determining, by the consensus node, a plurality of transactions having a same group identifier in a transaction pool as group transaction data, wherein the plurality of transactions are submitted to the transaction pool by a plurality of terminals within a predefined time period, each transaction having a unique execution sequence identifier;
   packetizing each of the group transaction data into a proposal block, and executing each of the group transaction data in the proposal block according to its corresponding execution sequence identifier to obtain a corresponding transaction execution result;
   when at least one transaction execution result comprises a transaction execution failure result, resetting each of the group transaction data with the transaction execution failure result, and updating the proposal block according to the transaction execution failure result corresponding to each of the group transaction data to obtain a target proposal block, further including:
      generating a result Merkle tree according to the transaction execution failure result corresponding to each of the group transaction data, the result Merkle tree comprising a root hash value; and
      adding the root hash value to a block header of the proposal block to obtain the target proposal block; and
   when the target proposal block is passed by consensus, performing accounting on the target proposal block and the transaction execution failure result corresponding to each of the group transaction data; and
   notifying each of the plurality of terminals of a transaction execution failure result associated with a transaction submitted by the terminal.

2. The method according to claim 1, wherein the determining, by the consensus node, a plurality of transactions having a same group identifier in a transaction pool as group transaction data comprises:
   acquiring, by the consensus node, transaction data corresponding to the plurality of transactions from the transaction pool, the transaction data comprising a group identifier and a group transaction quantity;
   adding the transaction data to a group cache queue corresponding to the group identifier to obtain an updated group cache queue within the predefined time period until when a quantity of transactions in the updated group cache queue is equal to the group transaction quantity; and
   determining the transaction data in the updated group cache queue as the group transaction data.

3. The method according to claim 1, wherein
   the packetizing each of the group transaction data into a proposal block comprises:
   sorting the plurality of transactions in the group transaction according to their corresponding execution sequence identifiers to obtain a sorted group transaction data; and
   packetizing the sorted group transaction data into the proposal block.

4. The method according to claim 1, wherein
   a quantity of the group transaction data is S, and S is a positive integer greater than 1; and
   the executing each of the group transaction data in the proposal block according to its corresponding execution sequence identifier to obtain a corresponding transaction execution result comprises:
   acquiring k-th group transaction data in the proposal block, and executing the k-th group transaction data to obtain a transaction execution result corresponding to the k-th group transaction data, k being a positive integer less than S;
   when the transaction execution result corresponding to the k-th group transaction data is a transaction execution success result, executing (k+1)-th group transaction data in the proposal block; and
   when the transaction execution result corresponding to the k-th group transaction data is a transaction execution failure result, resetting each of the (k+1)-th group transaction data to the S-th group transaction data in the proposal block with the transaction execution failure result.

5. The method according to claim 1, further comprising:
   broadcasting the proposal block to a communicable consensus node of the blockchain network, the communicable consensus node being configured to execute each of the group transaction data in the proposal block and update the proposal block according to the corresponding transaction execution result to obtain a communicable target proposal block;

receiving a block hash value of the communicable target proposal block transmitted by the communicable consensus node, and determining the block hash value of the communicable target proposal block as a to-be-matched block hash value; and when a quantity of the to-be-matched block hash values that are the same as a block hash value of the target proposal block is greater than a consensus quantity threshold, determining that the target proposal block is passed by consensus.

6. A computer device acting as a consensus node of a blockchain network, the computer device comprising: a processor, a memory and a network interface;

the processor being connected to the memory and the network interface, the network interface being configured to provide a data communication function, the memory being configured to store a computer program that, when executed by the processor, causes the computer device to perform a method for processing blockchain-based transactions, the method including:

determining, by the consensus node, a plurality of transactions having a same group identifier in a transaction pool as group transaction data, wherein the plurality of transactions are submitted to the transaction pool by a plurality of terminals within a predefined time period, each transaction having a unique execution sequence identifier;

packetizing each of the group transaction data into a proposal block, and executing each of the group transaction data in the proposal block according to its corresponding execution sequence identifier to obtain a corresponding transaction execution result;

when at least one transaction execution result comprises a transaction execution failure result, resetting each of the group transaction data with the transaction execution failure result, and updating the proposal block according to the transaction execution failure result corresponding to each of the group transaction data to obtain a target proposal block, further including:

generating a result Merkle tree according to the transaction execution failure result corresponding to each of the group transaction data, the result Merkle tree comprising a root hash value; and adding the root hash value to a block header of the proposal block to obtain the target proposal block; and when the target proposal block is passed by consensus, performing accounting on the target proposal block and the transaction execution failure result corresponding to each of the group transaction data; and notifying each of the plurality of terminals of a transaction execution failure result associated with a transaction submitted by the terminal.

7. The computer device according to claim 6, wherein the determining, by the consensus node, a plurality of transactions having a same group identifier in a transaction pool as group transaction data comprises:

acquiring, by the consensus node, transaction data corresponding to the plurality of transactions from the transaction pool, the transaction data comprising a group identifier and a group transaction quantity;

adding the transaction data to a group cache queue corresponding to the group identifier to obtain an updated group cache queue within the predefined time period until when a quantity of transactions in the updated group cache queue is equal to the group transaction quantity; and determining the transaction data in the updated group cache queue as the group transaction data.

8. The computer device according to claim 6, wherein the packetizing each of the group transaction data into a proposal block comprises:

sorting the plurality of transactions in the group transaction according to their corresponding execution sequence identifiers to obtain a sorted group transaction data; and packetizing the sorted group transaction data into the proposal block.

9. The computer device according to claim 6, wherein a quantity of the group transaction data is S, and S is a positive integer greater than 1; and the executing each of the group transaction data in the proposal block according to its corresponding execution sequence identifier to obtain a corresponding transaction execution result comprises:

acquiring k-th group transaction data in the proposal block, and executing the k-th group transaction data to obtain a transaction execution result corresponding to the k-th group transaction data, k being a positive integer less than S;

when the transaction execution result corresponding to the k-th group transaction data is a transaction execution success result, executing (k+1)-th group transaction data in the proposal block; and when the transaction execution result corresponding to the k-th group transaction data is a transaction execution failure result, resetting each of the (k+1)-th group transaction data to the S-th group transaction data in the proposal block with the transaction execution failure result.

10. The computer device according to claim 6, wherein the method further comprises:

broadcasting the proposal block to a communicable consensus node of the blockchain network, the communicable consensus node being configured to execute each of the group transaction data in the proposal block and update the proposal block according to the corresponding transaction execution result to obtain a communicable target proposal block;

receiving a block hash value of the communicable target proposal block transmitted by the communicable consensus node, and determining the block hash value of the communicable target proposal block as a to-be-matched block hash value; and when a quantity of the to-be-matched block hash values that are the same as a block hash value of the target proposal blocks is greater than a consensus quantity threshold, determining that the target proposal block is passed by consensus.

11. A non-transitory computer-readable storage medium storing a computer program that, when executed by a processor of a computer device acting as a consensus node of a blockchain network, causes the computer device to perform a method for processing blockchain-based transactions, the method including:

determining, by the consensus node, a plurality of transactions having a same group identifier in a transaction pool as group transaction data, wherein the plurality of transactions are submitted to the transaction pool by a plurality of terminals within a predefined time period, each transaction having a unique execution sequence identifier;

packetizing each of the group transaction data into a proposal block, and executing each of the group transaction data in the proposal block according to its corresponding execution sequence identifier to obtain a corresponding transaction execution result;

when at least one transaction execution result comprises a transaction execution failure result, resetting each of the group transaction data with the transaction execution failure result, and updating the proposal block according to the transaction execution failure result corresponding to each of the group transaction data to obtain a target proposal block, further including:
generating a result Merkle tree according to the transaction execution failure result corresponding to each of the group transaction data, the result Merkle tree comprising a root hash value; and
adding the root hash value to a block header of the proposal block to obtain the target proposal block; and when the target proposal block is passed by consensus, performing accounting on the target proposal block and the transaction execution failure result corresponding to each of the group transaction data; and notifying each of the plurality of terminals of a transaction execution failure result associated with a transaction submitted by the terminal.

12. The non-transitory computer-readable storage medium according to claim 11, wherein the determining, by the consensus node, a plurality of transactions having a same group identifier in a transaction pool as group transaction data comprises:
acquiring, by the consensus node, transaction data corresponding to the plurality of transactions from the transaction pool, the transaction data comprising a group identifier and a group transaction quantity;
adding the transaction data to a group cache queue corresponding to the group identifier to obtain an updated group cache queue within the predefined time period until when a quantity of transactions in the updated group cache queue is equal to the group transaction quantity; and
determining the transaction data in the updated group cache queue as the group transaction data.

13. The non-transitory computer-readable storage medium according to claim 11, wherein
the packetizing each of the group transaction data into a proposal block comprises:

sorting the plurality of transactions in the group transaction according to their corresponding execution sequence identifiers to obtain a sorted group transaction dat; and
packetizing the sorted group transaction data into the proposal block.

14. The non-transitory computer-readable storage medium according to claim 11, wherein
a quantity of the group transaction data is S, and S is a positive integer greater than 1; and
the executing each of the group transaction data in the proposal block according to its corresponding execution sequence identifier to obtain a corresponding transaction execution result comprises:
acquiring k-th group transaction data in the proposal block, and executing the k-th group transaction data to obtain a transaction execution result corresponding to the k-th group transaction data, k being a positive integer less than S;
when the transaction execution result corresponding to the k-th group transaction data is a transaction execution success result, executing (k+1)-th group transaction data in the proposal block; and
when the transaction execution result corresponding to the k-th group transaction data is a transaction execution failure result, resetting each of the (k+1)-th group transaction data to the S-th group transaction data in the proposal block with the transaction execution failure result.

15. The non-transitory computer-readable storage medium according to claim 11, wherein the method further comprises:
broadcasting the proposal block to a communicable consensus node of the blockchain network, the communicable consensus node being configured to execute each of the group transaction data in the proposal block and update the proposal block according to the corresponding transaction execution result to obtain a communicable target proposal block;
receiving a block hash value of the communicable target proposal block transmitted by the communicable consensus node, and determining the block hash value of the communicable target proposal block as a to-be-matched block hash value; and
when a quantity of the to-be-matched block hash values that are the same as a block hash value of the target proposal blocks is greater than a consensus quantity threshold, determining that the target proposal block is passed by consensus.

\* \* \* \* \*